(12) United States Patent
Lee et al.

(10) Patent No.: US 11,635,805 B2
(45) Date of Patent: Apr. 25, 2023

(54) WEARABLE DEVICE FOR USING EXTERNAL ENTITY AS CONTROLLER AND METHOD

(71) Applicant: Samsung Electronics Co., Ltd., Gyeonggi-do (KR)

(72) Inventors: Jueun Lee, Gyeonggi-do (KR); Choonkyoung Moon, Gyeonggi-do (KR); Shinjae Jung, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/415,847

(22) PCT Filed: Dec. 19, 2019

(86) PCT No.: PCT/KR2019/018133
§ 371 (c)(1),
(2) Date: Jun. 18, 2021

(87) PCT Pub. No.: WO2020/130688
PCT Pub. Date: Jun. 25, 2020

(65) Prior Publication Data
US 2022/0083131 A1  Mar. 17, 2022

(30) Foreign Application Priority Data

Dec. 19, 2018 (KR) ........................ 10-2018-0165315

(51) Int. Cl.
*G06F 3/01* (2006.01)
*G06F 1/16* (2006.01)

(52) U.S. Cl.
CPC .............. *G06F 3/012* (2013.01); *G06F 1/163* (2013.01); *G06F 3/017* (2013.01)

(58) Field of Classification Search
CPC ........... G06F 3/011; G06F 3/012; G06F 3/017
See application file for complete search history.

(56) References Cited

U.S. PATENT DOCUMENTS 9,361,730 B2   6/2016  Keating et al.
9,898,869 B2   2/2018  Shapira et al.
(Continued)

FOREIGN PATENT DOCUMENTS

JP        2016-516241 A     6/2016
KR   10-2017-0018930 A      2/2017
(Continued)

*Primary Examiner* — Mark Edwards
*Assistant Examiner* — Chayce R Bibbee
(74) *Attorney, Agent, or Firm* — Cha & Reiter, LLC

(57) ABSTRACT

A wearable device according to various embodiments may include a display configured to allow external light toward a first surface to go through a second surface opposite to the first surface, and having a display area on the second surface, a memory for storing instructions, at least one camera, and at least one processor configured to, when executing the instructions, display content on the display area of the display, detect an external entity using the at least one camera, recognize the external entity as a controller for controlling the content having one designated shape of a plurality of designated shapes, identify a posture change of the external entity recognized as the controller, a gesture input for the external entity recognized as the controller, or a combination thereof using the at least one camera, and control the content, based on the identification.

15 Claims, 21 Drawing Sheets

(56) References Cited

U.S. PATENT DOCUMENTS

| | | |
|---|---|---|
| 10,664,993 B1 * | 5/2020 | Reddy .................... G06T 7/75 |
| 2010/0289817 A1 | 11/2010 | Meier et al. |
| 2014/0198468 A1 * | 7/2014 | Kim .................... G09G 3/3208 |
| | | 361/760 |
| 2014/0267228 A1 | 9/2014 | Ofek et al. |
| 2018/0197336 A1 | 7/2018 | Rochford et al. |
| 2018/0253145 A1 | 9/2018 | Swaminathan et al. |
| 2018/0307303 A1 * | 10/2018 | Powderly ................ G06F 3/013 |
| 2020/0394841 A1 | 12/2020 | Kaino et al. |

FOREIGN PATENT DOCUMENTS

| | | | |
|---|---|---|---|
| KR | 10-2017-0125618 A | 11/2017 | |
| WO | 2015/192117 A1 | 12/2015 | |

\* cited by examiner

WEARABLE DEVICE FOR USING EXTERNAL ENTITY AS CONTROLLER AND METHOD

CROSS REFERENCE TO RELATED APPLICATIONS

This application is a National Phase Entry of PCT International Application No. PCT/KR2019/018133, which was filed on Dec. 19, 2019, and claims a priority to Korean Patent Application No. 10-2018-0165315, which was filed on Dec. 19, 2018, the contents of which are incorporated herein by reference.

TECHNICAL FIELD

Various embodiments to be described below relate to a wearable device for using an external entity as a controller and an operating method thereof.

BACKGROUND ART

To provide enhanced user experience, an electronic device for providing an augmented reality (AR) service which displays information generated by a computer as associated with an entity residing in a real-world is being developed.

DISCLOSURE OF INVENTION

Technical Problem

A wearable device may be worn by a user, to provide an augmented reality service. The user wearing the wearable device may generate a user input (e.g., a natural user interaction (NUI) such as a gesture input, a voice input, etc.) distinguished from a touch input for a display, to control content displayed on the display of the wearable device. Hence, a method for performing the user input more clearly and intuitively may be required at the wearable device.

The technical problems to be achieved by this disclosure are not limited to the technical problems mentioned above, and other technical problems not mentioned may be clearly understood by those skilled in the art to which the present invention pertains from the following disclosure.

Solution to Problem

A wearable device according to various embodiments may include a display configured to allow external light toward a first surface to go through a second surface opposite to the first surface, and having a display area on the second surface, a memory for storing instructions, at least one camera, and at least one processor configured to, when executing the instructions, display content on the display area of the display, detect an external entity using the at least one camera, recognize the external entity as a controller for controlling the content having one designated shape of a plurality of designated shapes, identify a posture change of the external entity recognized as the controller, a gesture input for the external entity recognized as the controller, or a combination thereof using the at least one camera, and control the content, based on the identification.

A method for operating a wearable device according to various embodiments may include displaying content on a display area of a display of the wearable device configured to allow external light toward a first surface to go through a second surface opposite to the first surface, and having the display area on the second surface, detecting an external entity using at least one camera of the wearable device, recognizing the external entity as a controller for controlling the content having one designated shape of a plurality of designated shapes, identifying a posture change of the external entity recognized as the controller, a gesture input for the external entity recognized as the controller, or a combination thereof using the at least one camera, and controlling the content, based on the identification.

Advantageous Effects of Invention

A wearable device and a method for operating the same according to various embodiments may provide enhanced user experience (UX), by using an external entity as a controller for controlling content displayed on a display of the wearable device.

Effects obtainable from the present disclosure are not limited to the above-mentioned effects, and other effects which are not mentioned may be clearly understood by those skilled in the art of the present disclosure through the following descriptions.

BEST MODE FOR CARRYING OUT THE INVENTION

Figure 1:
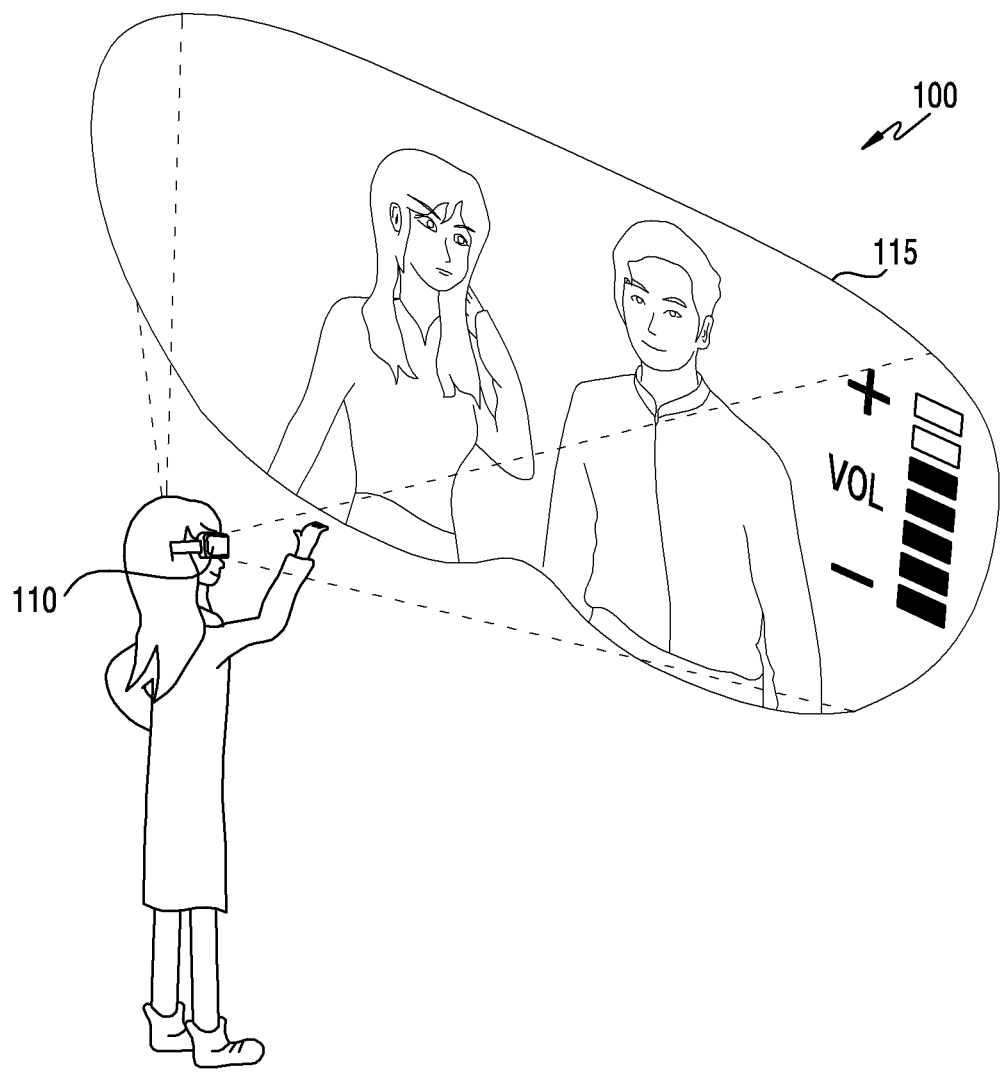
FIG. 1 illustrates an example of an environment including a wearable device according to various embodiments.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

FIG. 1 illustrates an example of an environment including a wearable device according to various embodiments.

Referring to FIG. 1, a wearable device 110 may be included in an environment 100.

In various embodiments, the wearable device 110 may be used to provide an augmented reality service. In various embodiments, to provide the augmented reality service, the wearable device 110 may include at least one transparent display. Since the at least one transparent display is configured to transmit external light toward a first surface of the at least one transparent display through a second surface of the at least one transparent display, the at least one transparent display may display a virtual entity together with an external entity in a real-world. In this disclosure, the virtual entity may be referred to as a visual entity, in that it is recognized by a user. In various embodiments, to provide the augmented reality service, the wearable device 110 may include a camera used to recognize the external entity, a camera for tracking a user's eye wearing the wearable device 110, or a combination thereof. In various embodiments, to provide the augmented reality service, the wearable device 110 may include a communication circuit. The communication circuit may be used to obtain information of the external entity from an external electronic device (e.g., a server or a smartphone), or to obtain information for displaying the virtual entity from an external electronic device.

In various embodiments, the wearable device 110 in the environment 100 may receive a user input, to control a screen (e.g., content) displayed on the display of the wearable device 110. Since the screen of the wearable device 110 is displayed together with the external entity viewed in a display area 115 of the display, the user input may be defined as another input distinguished from a touch input for the display. For example, the user input may be a gesture input caused by a body part of the user wearing the wearable device 110 or an eye gaze input caused by the eye of the user wearing the wearable device 110. Since the input may have an unclear sense of identification, a controller distinguished from the wearable device may be required in using the wearable device to enhance the user experience.

However, since the user is required to carry the controller together with the wearable device 110 in using the separate controller, it may cause inconvenience to the user in terms of portability.

The wearable device 110 according to various embodiments may provide a service for controlling the screen using an input through the external entity recognized as the controller, by defining or recognizing the external entity positioned near the wearable device 110 as the controller. The wearable device 110 according to various embodiments may, by providing the service, provide a control service suitable to a user's intention.

Figure 2:
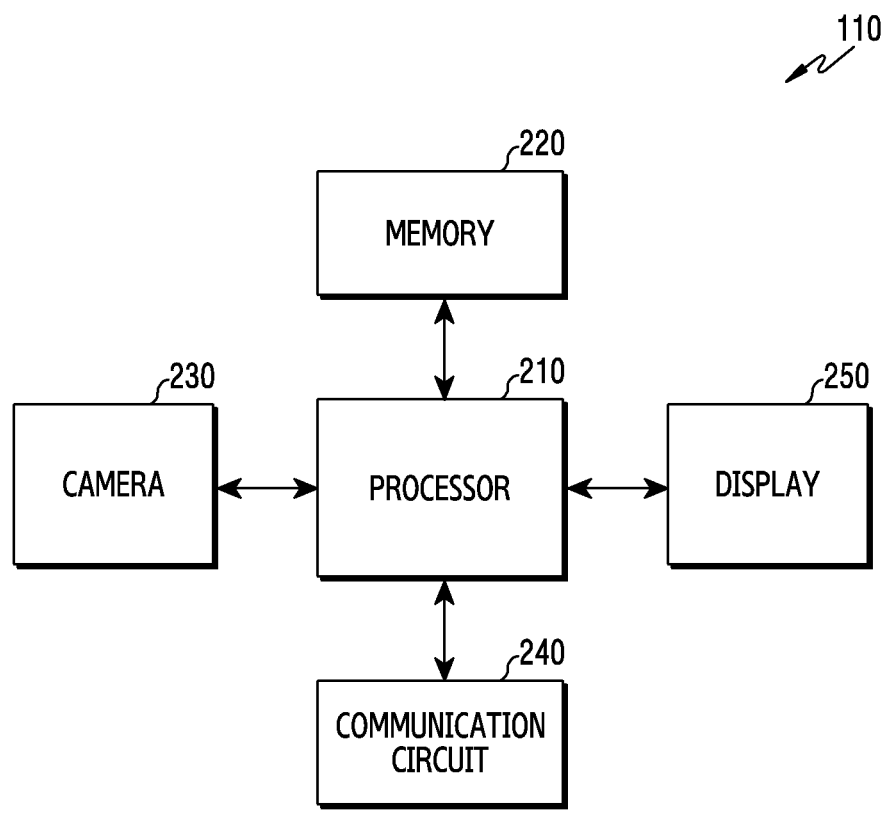
FIG. 2 illustrates an example of a functional configuration of a wearable device according to various embodiments.

FIG. 2 illustrates an example of a functional configuration of a wearable device according to various embodiments. Such a functional configuration may be included in the wearable device 110 shown in FIG. 1.

Referring to FIG. 2, the wearable device 110 may include a processor 210, a memory 220, a camera 230, a communication circuit 240, and a display 250.

The processor 210 may control overall operations of the wearable device 110. For example, the processor 210 may record data in the memory 220, and read data recorded in the memory 220. For another example, the processor 210 may acquire an image through the camera 230. For yet another example, the processor 210 may transmit a signal to another electronic device (e.g., the electronic device 120) or receive a signal from another electronic device (e.g., the electronic device 120) through the communication circuit 240. For still another example, the processor 210 may display information through the display 250. According to embodiments, the processor 210 may include a plurality of processors. For example, the processor 210 may include an application processor (AP) for controlling an upper layer such as an application program, a communication processor (CP) for performing control for communication, a display controller for controlling a screen displayed on the display 250 and the like.

The processor 210 may be configured to implement procedures and/or methods proposed in the present disclosure.

The memory 220 may store an instruction for controlling the wearable device 110, a control command code, control data, or user data. For example, the memory 220 may store an application, an operating system (OS), middleware, and a device driver.

The memory 220 may include one or more of a volatile memory or a non-volatile memory. The volatile memory may include a dynamic random access memory (DRAM), a static RAM (SRAM), a synchronous DRAM (SDRAM), a phase-change RAM (PRAM), a magnetic RAM (MRAM), a resistive RAM (RRAM), a ferroelectric RAM (FeRAM), and the like. The non-volatile memory may include a read only memory (ROM), a programmable ROM (PROM), an electrically programmable ROM (EPROM), an electrically erasable ROM (EPMROM), a flash memory, and the like.

The memory 220 may further include a non-volatile medium such as a hard disk drive (HDD), a solid state disk (SSD), an embedded multi media card (eMMC), and a universal flash storage (UFS).

The memory 220 may be operably or operatively coupled with the processor 210.

The camera 230 may be used to acquire an image of the environment viewed within a display area of the display 250. The camera 230 may be disposed toward the environment, to acquire the image of the environment viewed in the display area of the display 250. A field of view (FOV) of the camera 230 disposed toward the environment may be configured to cover a wider area than the display area of the display 250, or cover an area corresponding to the display area of the display 250, to acquire the image of the environment viewed in the display area of the display 250. The FOV of the camera 230 disposed toward the environment may be configured to cover a wider area than an area covered by a user's FOV wearing the wearable device 110, or to cover the area covered by the user's FOV, to acquire the image of the environment viewed in the display area of the display 250. The camera 230 disposed toward the environment may include a plurality of cameras, to acquire the image of the environment viewed in the display area of the display 250. In various embodiments, the plurality of the cameras may be configured as a pair of cameras, to acquire a stereoscopic image. A direction of a first camera included in the pair of the cameras may be the same as a direction of a second camera included in the pair of the cameras, to acquire the stereoscopic image. To acquire the stereoscopic image, an FOV of the first camera and an FOV of the second camera may have disparity.

The camera 230 may be further used to track the user's eye wearing the wearable device 110. For example, the camera 230 may be disposed toward the user's eye, such that the FOV of the camera 230 covers an area including the user's eye wearing the wearable device 110.

The camera 230 may be operably or operatively coupled with the processor 210.

The communication circuit 240 may include various communication functions (e.g., cellular communication, Bluetooth, near field communication (NFC), Wi-Fi, etc.) for communication between the wearable device 110 and at least one external device (e.g., a smartphone, a server, etc.). In other words, the communication circuit 240 may establish the communication between the wearable device 110 and the at least one external device.

The communication circuit 240 may be operably or operatively coupled with the processor 210.

The display 250 may include at least one transparent display, so that the user wearing the wearable device 110 may view a real-world. For example, the display 250 may be configured to allow external light toward a first surface to go through a second surface which is different from the first surface, and to display information on the second surface. For example, the second surface may be opposite to the first surface. The display 250 may display a graphical user interface (GUI) so that the user may interact with the wearable device 110.

The display 250 may be operably or operatively coupled with the processor 210.

In various embodiments, the processor 210 may display content on the display area of the display 250, together with external entity in the real world viewed within the display area (e.g., the display area 115 of FIG. 1) of the display 250. In various embodiments, the content may include multimedia content, a user interface of an application, a visual entity for receiving a user input, or a combination thereof. In various embodiments, the content may be displayed on the display area of the display 250, based on data received through the communication circuit 240 from another electronic device. In various embodiments, the content may be displayed on the display area of the display 250, based on data processed by the processor 210, independently (or regardless) of the another electronic device. In various embodiments, the content may include information related to the external entity viewed in the display area of the display 250. If the content includes the information related to the external entity, the content may be displayed as associated with the external entity. For example, if the content includes the information related to the external entity, the content may be displayed in proximity to the external entity or as at least partially overlapped with the external entity. In various embodiments, the content may include information independent from the external entity viewed in the display area of the display 250.

In various embodiments, the processor 210 may acquire recognition information of the external entity of the real world viewed in the display area of the display 250. For example, the processor 210 may transmit information of an image including a visual entity corresponding to the external entity acquired through the camera 230 to another electronic device (e.g., a smartphone, a server, etc.) through the communication circuit 240, and obtain recognition information of the external entity from the another electronic device through the communication circuit 240. As another example, the processor 210 may obtain the recognition information of the external entity by recognizing the image including the visual entity corresponding to the external entity without use of the another electronic device.

In various embodiments, the processor 210 may detect an external entity, while the wearable device 110 is worn by the user. In various embodiments, while the wearable device 110 is worn by the user, the processor 210 may detect the external entity positioned around the wearable device 110, based at least on the image acquired using the camera 230. In various embodiments, the detection of the external entity may be performed by interworking with at least one external electronic device, or may be performed only by the wearable device 110 without use of the at least one external electronic device.

Figure 3:
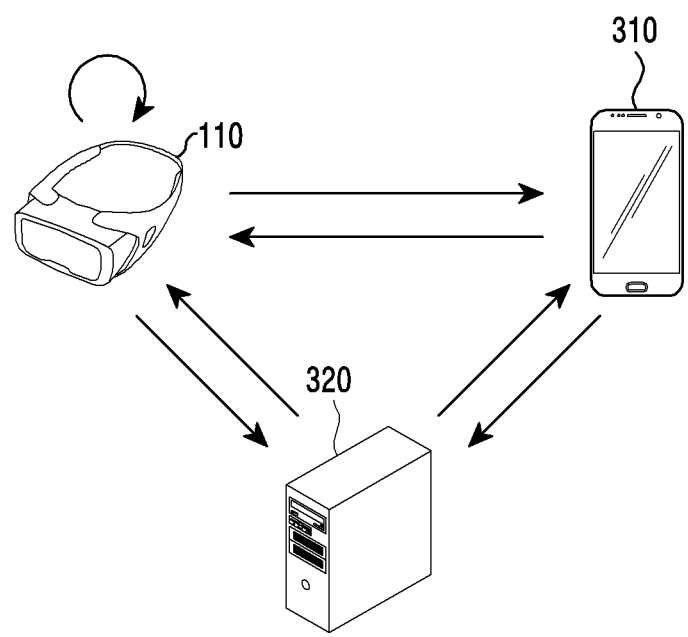
FIG. 3 illustrates an example of image recognition performed by a wearable device according to various embodiments.

For example, referring to FIG. 3, the processor 210 may transmit information of an image acquired using the camera 230 to an electronic device 310 or a server 320 through the communication circuit 240. In various embodiments, the information of the image may include a visual entity corresponding to the external entity located in proximity to the wearable device 110. In various embodiments, to recognize what the external entity included in the image is, the processor 210 may transmit the image information to the electronic device 310 or the server 320 through the communication circuit 240. The electronic device 310 or the server 320 may detect the external entity included in the image by recognizing the image, based on receiving the image information from the wearable device 110. The electronic device 310 or the server 320 may transmit the information of the detected external entity to the wearable device 110 as a result of the image recognition. The processor 210 may detect the external entity, by receiving the information of the external entity.

As another example, referring to FIG. 3, the processor 210 may transmit information of an image acquired using the camera 230 to the electronic device 310 through the communication circuit 240. For example, if the wearable device 110 does not have communication capability for accessing the server 320, the wearable device 110 may transmit the image information to the electronic device 310 interworking with the wearable device 110 using the communication circuit 240. The electronic device 310 may forward the image information to the server 320. The server 320 may detect the external entity included in the image, by recognizing the image based on receiving the image information. The server 320 may transmit the external entity information to the wearable device 110 through the electronic device 310 as a result of the image recognition. The processor 210 may detect the external entity, by receiving the external entity information.

As yet another example, referring to FIG. 3, the processor 210 may recognize an image acquired using the camera 230 within the wearable device 110 without use of the electronic device 310 and the server 320. Since the image includes a visual entity corresponding to the external entity, the processor 210 may detect the external entity, based on the recognition. However, it is not limited thereto.

Figure 4A:
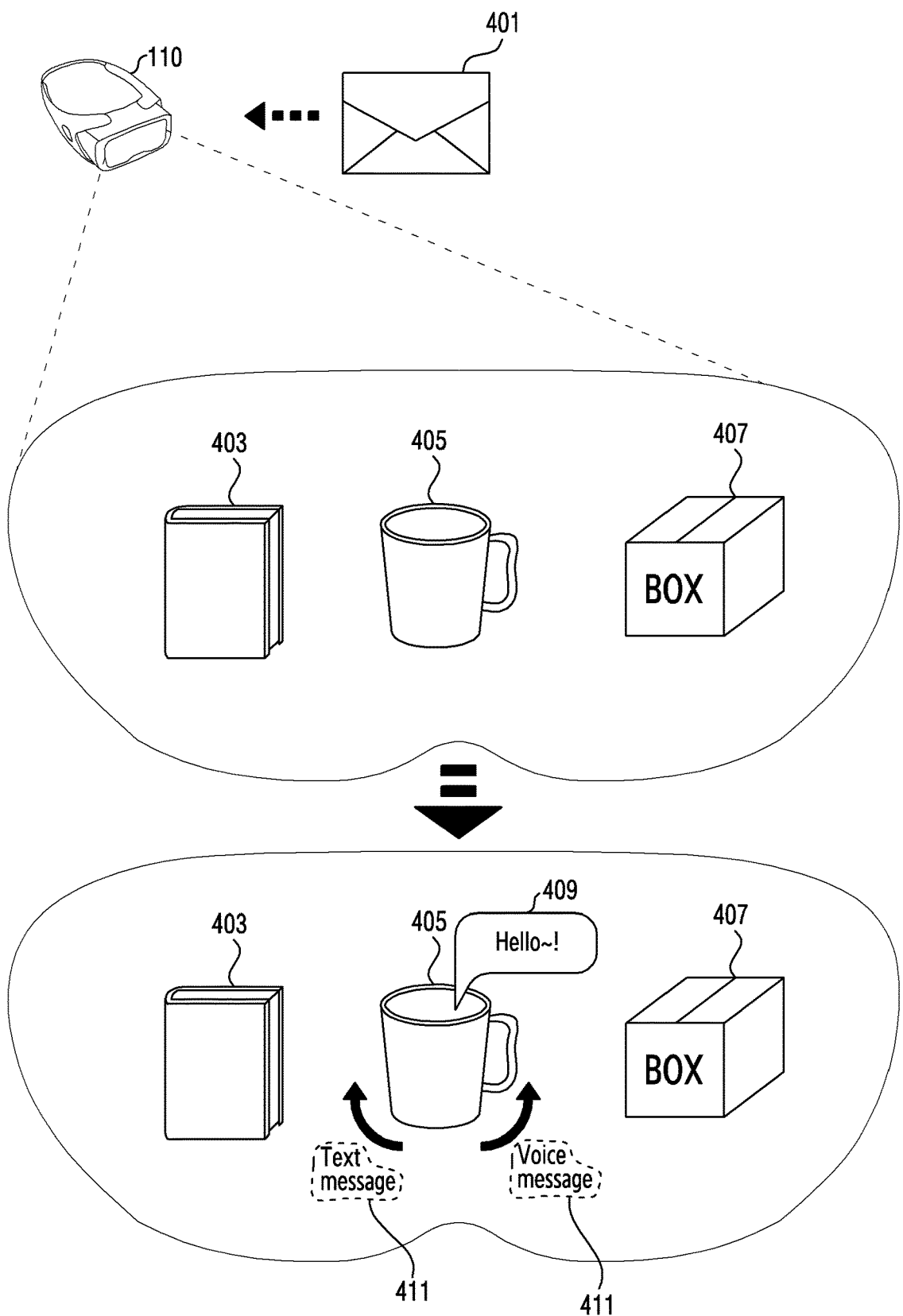
FIG. 4A illustrates an example of a wearable device which triggers detection of an external entity according to various embodiments.

In various embodiments, the detection of the external entity may be triggered by various conditions. For example, the detection of the external entity may be triggered, based on wearing the wearable device 110 on the user. As another example, the detection of the external entity may be triggered, based on receiving the information at the wearable device 110. For example, referring to FIG. 4A, the wearable device 110 may receive a message 401 from the external electronic device 110. In response to receiving the message 401, the processor 210 may trigger detecting an external entity 403, an external entity 405, and an external entity 407 included in the display area of the display 250, the area covered by the FOV of the user wearing the wearable device 110, or the area covered by the FOV of the camera 230. For example, the detection may be performed to provide information related to the message 401. For example, based on the detection, the processor 210 may display information 409 of the message 401 on the display area of the display 250 as associated with the external entity 405. Together with the information 409, the processor 210 may further display at least one visual entity 411 for controlling the message 401 on the display area of the display 250. Detailed descriptions on the at least one visual entity 411 shall be described later.

Figure 4B:
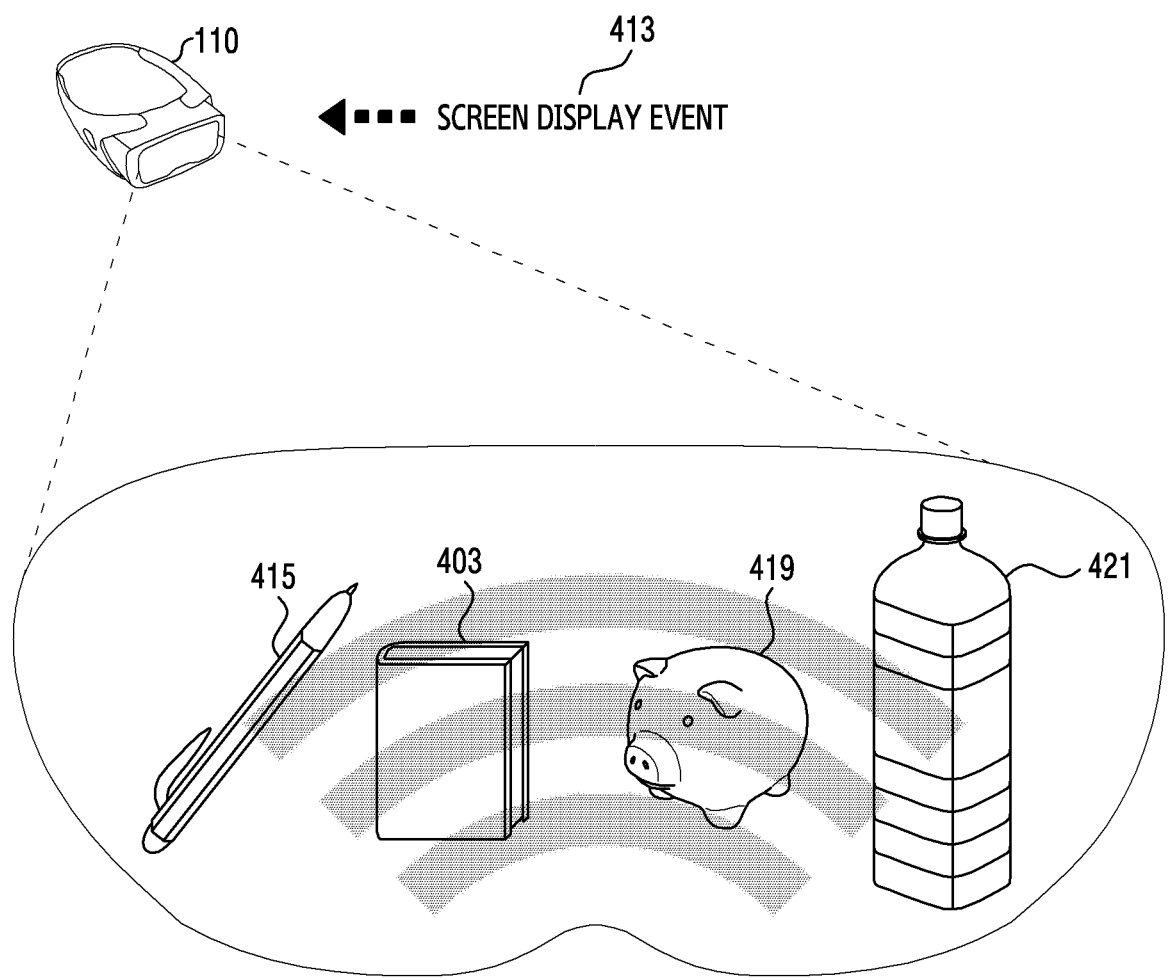
FIG. 4B illustrates another example of the wearable device which triggers the external entity detection according to various embodiments.

As yet another example, the detection of the external entity may be triggered by occurrence of a screen display event. For example, referring to FIG. 4B, the processor 210 may detect a screen display event 413, while the wearable device 110 is worn by the user. For example, the processor 210 may detect the screen display event 413, by receiving content information from an external electronic device, or by detecting that the display 250 of an inactive state is switched to an active state. In response to detecting the screen display event 413, the processor 210 may trigger detecting an external entity 415, an external entity 417, an external entity 419 or an external entity 421 included in the display area of the display 250, the area covered by the FOV of the user wearing the wearable device 110, or the area covered by the FOV of the camera 230. However, it is not limited thereto.

Figure 4C:
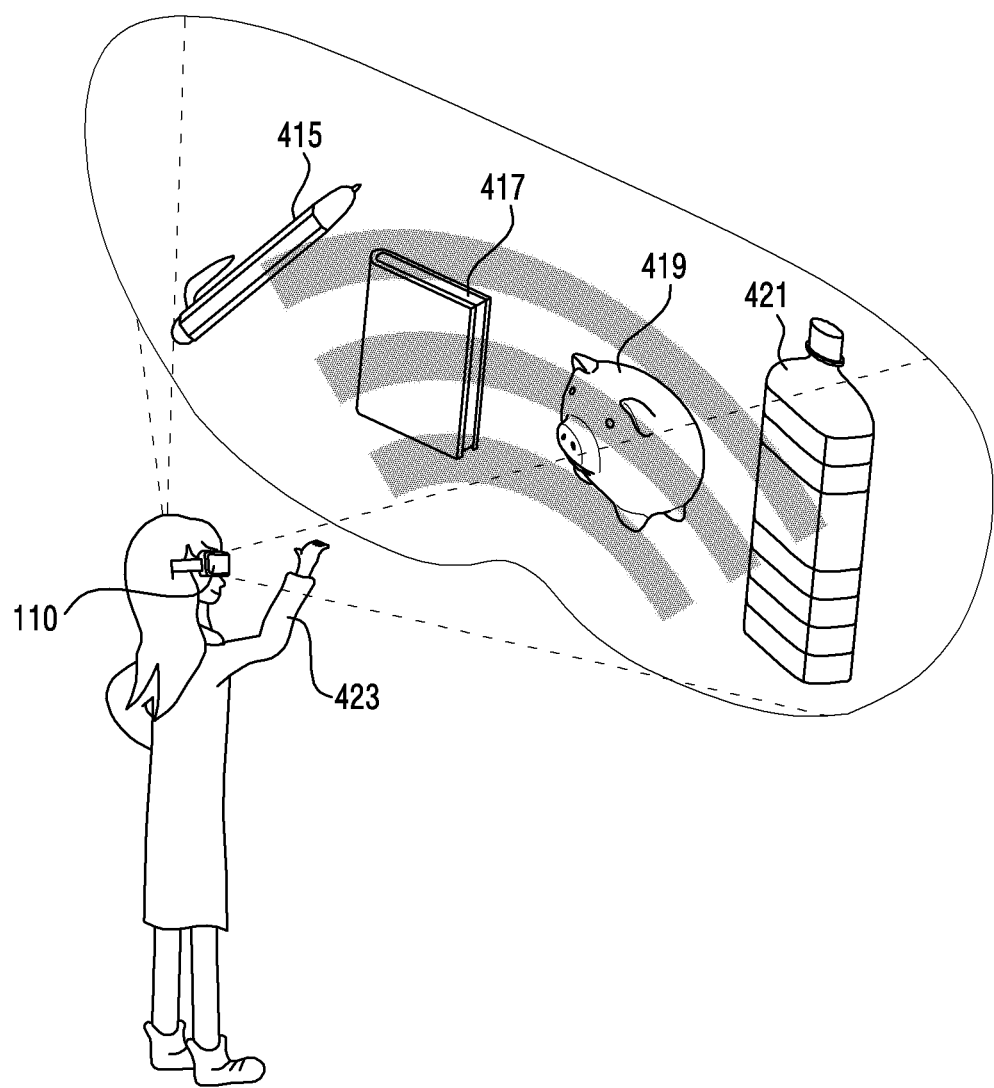
FIG. 4C illustrates yet another example of the wearable device which triggers the external entity detection according to various embodiments.

As still another example, the detection of the external entity may be triggered, by a designated input received from the user wearing the wearable device 110. For example, referring to FIG. 4C, while the wearable device 110 is worn by the user, the processor 210 may receive a gesture input 423 requesting to trigger the detection of the external entity. For example, the gesture input 423 may include an input which swipes at least one external entity included in the display area of the display 250 or the area covered by the user's FOV. In response to receiving the gesture input 423, the processor 210 may trigger detecting the external entity 415, the external entity 417, the external entity 419, or the external entity 421. However, it is not limited thereto.

For a further example, the detection of the external entity may be triggered by an explicit input of the user wearing the wearable device 110. For example, the processor 210 may detect the detection of the external entity, based on detecting a user's input for selecting an external entity (e.g., an eye gaze input for gazing at the external entity for a designated time or a gesture input for pointing the external for a designated time or holding the external entity) using the camera 230.

Figure 5:
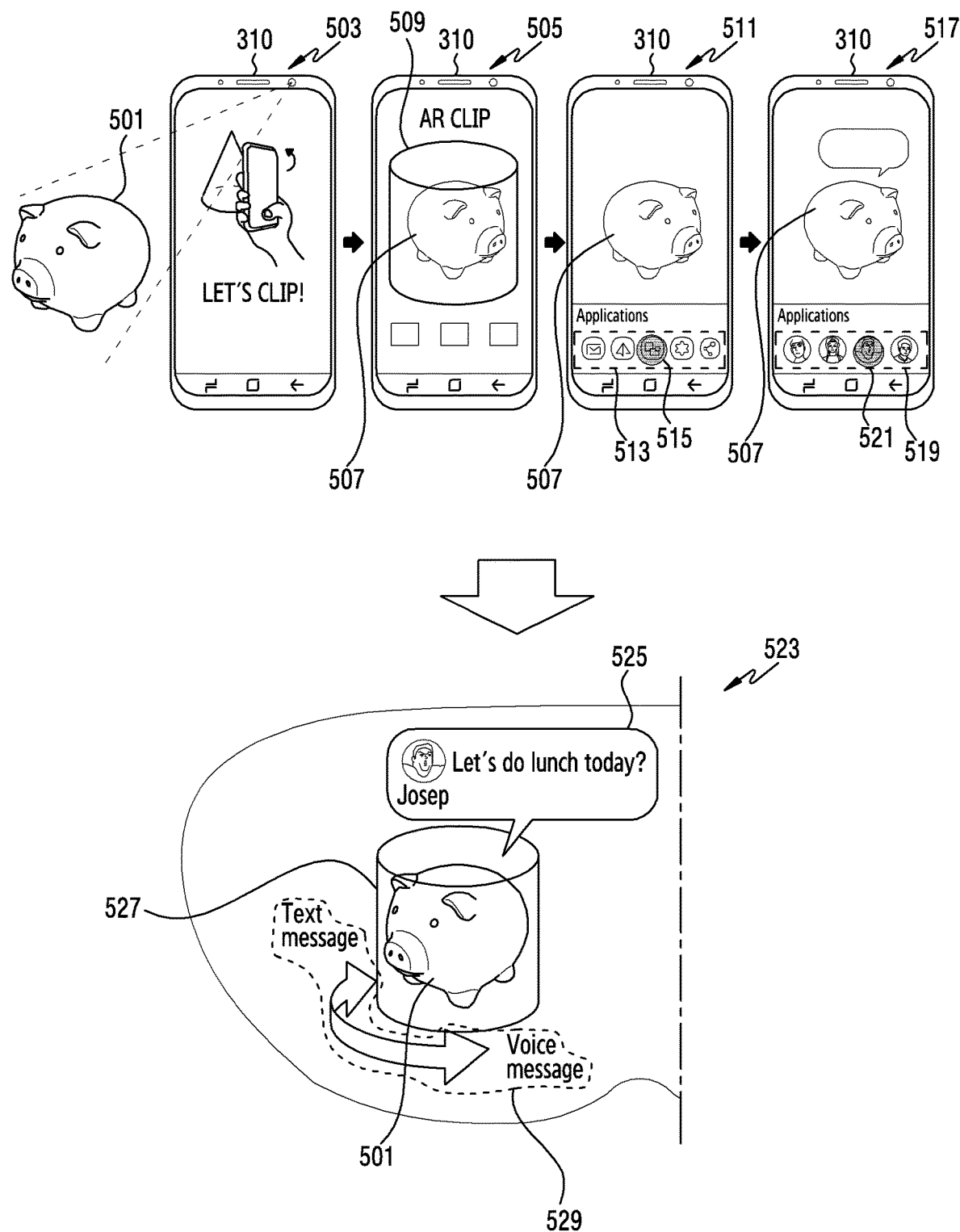
FIG. 5 illustrates an example of a wearable device which recognizes an external entity as a controller using an external electronic device according to various embodiments.

In various embodiments, the detection of the external entity may detect a preregistered external entity, or may detect an unregistered external entity. For example, the wearable device 110 may preregister information of the external entity in the memory 220. The processor 210 may receive the external entity information from an external electronic device (e.g., the smartphone 310) interworking with the wearable device 110 through the communication circuit 240, and preregister the received external entity information in the memory 220. In various embodiments, the external entity included in the preregistered information may be defined as a controller of the wearable device 110 by the external electronic device (e.g., the smartphone 310). For example, referring to FIG. 5, to register an external entity 501 as the controller of the wearable device 110, the smartphone 310 may acquire an image of the external entity 501 using a camera or a depth sensor of the smartphone 310, as in a state 503. The image may be a three dimensions (3D) image. Acquiring the image may be performed by an application related to the wearable device 110 installed in the smartphone 310 (e.g., an application for communication with the wearable device 110 or screen sharing with the wearable device 110). The smartphone 310 may extract a visual entity 507 corresponding to the external entity 501 from the image, and identify a shape (e.g., a cylinder) 509 corresponding to a shape of the visual entity 507 by recognizing the visual entity 507, as in a state 505. Detailed description of the identification shall be described later. In various embodiments, the smartphone 310 may map the shape 509 to the external entity 501, and store in the smartphone 310 data for indicating that the shape 509 is mapped to the external entity 501. In various embodiments, based on the mapping, the smartphone 310 may store data for defining or recognizing the external entity 501 as the controller of the wearable device 110 having the shape 509 in the smartphone 310. In various embodiments, the smartphone 310 may store data in the smartphone 310 data of feature points of the visual entity 507 used to recognize the visual entity 507 and to identify the shape 509 corresponding to the shape of the visual entity 507.

In various embodiments, based on the storing, the smartphone 310 may display a user interface of the application for defining a function supported by the controller on the display of the smartphone 310, in a state 511. For example, the user interface may display a list 513 of at least one application controlled by the controller. While displaying the list 513, the smartphone 310 may receive a touch input 515 for selecting one visual entity of at least one visual entity indicating the at least one application. In response to receiving the touch input 515, the smartphone 310 may define to control another application (e.g., a message application) indicated by the visual entity selected by the touch input 515 using the controller. The smartphone 310 may generate data indicating that the another application indicated by the visual entity selected by the touch input 515 is controlled using the controller, and store the generated data in the smartphone 310. The smartphone 310 may further display a list 519 for defining to control at least one function of functions of the another application using the controller, as in a state 517. For example, the list 519 may be displayed in response to receiving the touch input 515. The smartphone 310 may detect a touch input 521 for selecting one (e.g., identification information of Josep) of the functions (e.g., identification information of other users) included in the list 519. In response to detecting the touch input 521, the smartphone 310 may define controlling the function of the another application (e.g., controlling a message received from Josep) using the controller. The smartphone 310 may generate data indicating that the function of the another application is controlled using the controller, and store the generated data in the smartphone 310.

In various embodiments, while connecting the wearable device 110 or in response to connecting the wearable device 110, the smartphone 310 may transmit information of the external entity 501 including the stored data to the wearable device 110. The processor 210 may register the information received from the smartphone 310, to use the external entity 501 as the controller for controlling the another application or to use the external entity 501 as the controller for controlling the function of the another application. After receiving the information, the processor 210 may detect an external entity related to the registered information among at least one external entity included in the image acquired through the camera 230. After detecting the external entity, the processor 210 may detect that control of the another application (or the function of the another applications) installed in the wearable device 110 or installed in the smartphone 310 interworking with the wearable device 110 is required. For example, as in a state 523, the processor 210 may receive a message from Josep using the communication circuit 240 through the another application controlled by the external entity 501. In response to receiving the message, as associated with the external entity 501 viewed in the display area of the display 250, the processor 210 may display information 525, 527, and 529 related to the message on the display area of the display 250. For example, the processor 210 may display the information 525 of content included in the message as associated with the external entity 501. For example, the processor 210 may display the information 527 indicating the shape 509 of the controller provided by the external entity 501 as associated with the external entity 501. For example, as associated with the external entity 501, the processor 210 may display the information 529 for guiding a method of controlling the external entity 501 defined by the controller having the shape 509. For example, the information 529 may include a visual entity indicating that a response message for the received message may be transmitted as a text message by an input which rotates the external entity 501 clockwise and a visual entity indicating that a response message for the received message may be transmitted as a voice message by an input which rotates the external entity counterclockwise.

Figure 6:
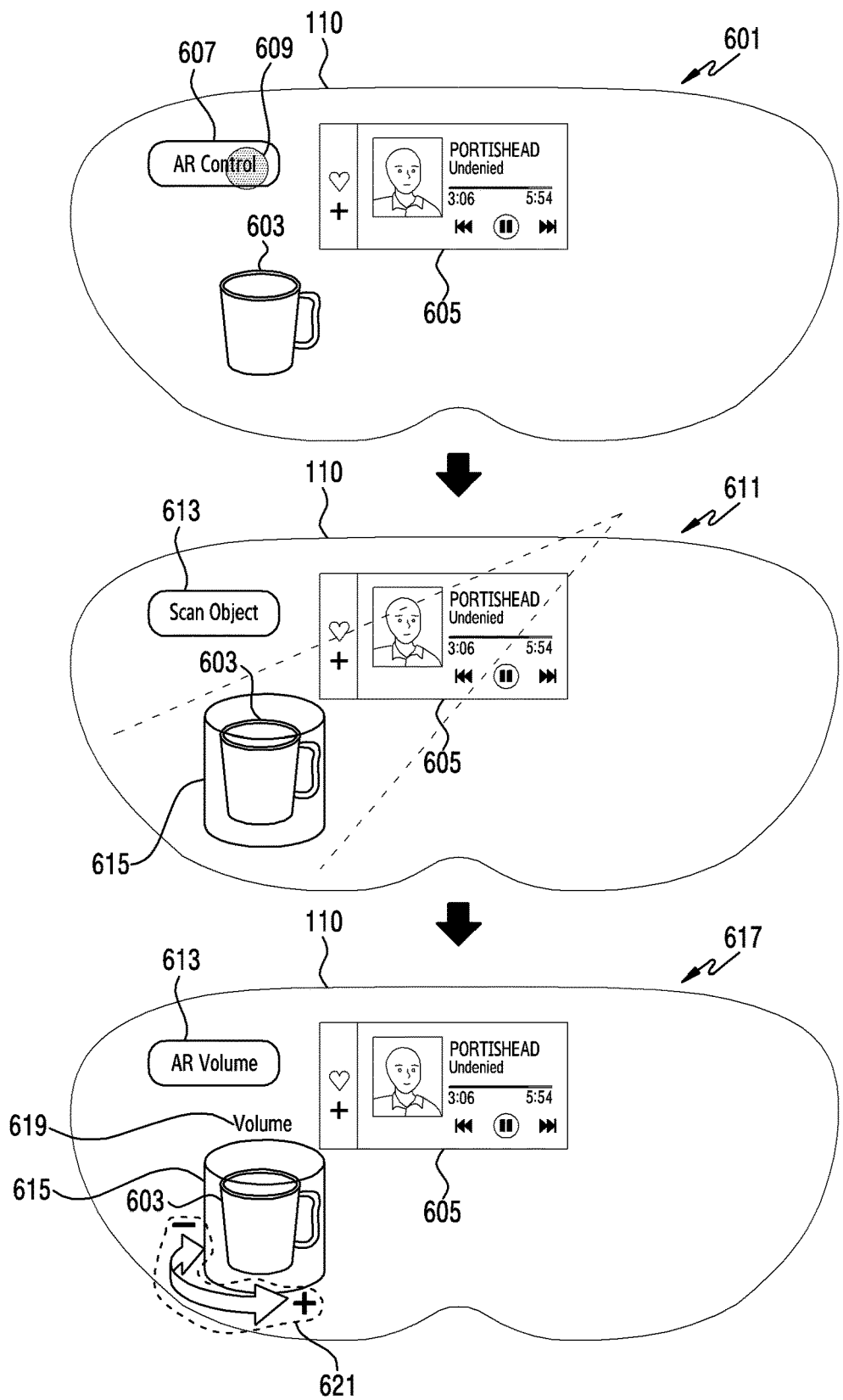
FIG. 6 illustrates an example of a wearable device which recognizes an external entity as a controller according to various embodiments.

For another example, the processor 210 may detect the external entity, while the external entity is not registered. For example, the processor 210 may detect the external entity having a shape which may be used as the controller among external entities covered by the FOV of the camera 230. For example, referring to FIG. 6, the processor 210 may display content 605 on the display area of the display 250, together with an external entity 603 viewed on the display area of the display 250, as in a state 601. The processor 210 may further display a visual entity 607 for receiving a user input indicating to control the content 605 together with the content 605. The processor 210 may detect an eye gaze input 609 (or a gesture input 609) for the visual entity 607 using the camera 230. In response to detecting the eye gaze input 609, the processor 210 may detect the external entity 603, as in a state 611. During the detection, the processor 210 may switch the visual entity 607 to a visual entity 615 indicating that the external entity 603 is being detected.

In response to detecting the external entity 603, the processor 210 may recognize the external entity 603 as the controller having the shape corresponding to the shape of the external entity 603. Based on the recognition, the processor 210 may display a visual entity 615 indicating that the external entity 501 is recognized as the controller having the shape, as associated with the external entity 603.

In various embodiments, the processor 210 may identify a posture change of the external entity 603, a gesture input for the external entity 603, or whether a combination thereof is received using the camera 230 after the recognition, as in a state 617. The processor 210 may control the content 605, based on identifying the posture change of the external entity 603, the gesture input for the external entity, or receiving a combination thereof, and display information 619 and 621 related to the control of the content 605 as associated with the external entity 603 displayed on the display area of the display 250. For example, the processor 210 may display the information 619 indicating which function of the content 605 is controlled as associated with the external entity 603. As another example, the processor 210 may display the information 621 indicating how the function of the content 605 is controlled by the external entity 603 recognized by the controller as associated with the external entity 603. However, it is not limited thereto.

In various embodiments, the wearable device 110 may recognize the detected external entity as the controller having one designated shape of a plurality of designated shapes. In various embodiments, the plurality of the designated shapes each may be a shape which may cause an intuitive input to the wearable device 110. In various embodiments, the plurality of the designated shapes each may be a representative shape of an auxiliary input device which is well known. For example, referring to FIG. 7, a first designated shape among the plurality of the designated shapes may be a stick 701. In various embodiments, an external entity recognized as the controller having the shape of the stick 701 may be used as a pointer for controlling content displayed on the display area of the display 250, as shown in an example 703. As another example, referring to FIG. 7, a second designated shape among the plurality of the designated shapes may be a quadrangular surface 705. In various embodiments, an external entity recognized as the controller having the shape of the quadrangular surface 705 may be used as a pad for receiving a tap input or receiving a rotation input, as shown in an example 707. As yet another example, referring to FIG. 7, a third designated shape among the plurality of the designated shapes may be a cylinder 709. In various embodiments, an external entity recognized as the controller having the shape of the cylinder 709 may be used as a rotating structure for controlling content displayed on the display area of the display 250, as shown in an example 711. As still another example, referring to FIG. 7, a fourth designated shape among the plurality of the designated shapes may be a cube 713. In various embodiments, an external entity recognized as the controller having the shape of the cube 713 may be used as a dice in which a plurality of functions for controlling content displayed on the display area of the display 250 are associated with faces of the cube 713, as shown in an example 715. As a further example, referring to FIG. 7, a fifth designated shape among the plurality of the designated shapes may be a sphere 717. In various embodiments, an external entity recognized as the controller having the shape of the sphere 717 may be used as a controller having a function for scrolling the content displayed on the display area of the display 250 in various directions, as shown in an example 719. However, it is not limited thereto.

Figure 7:
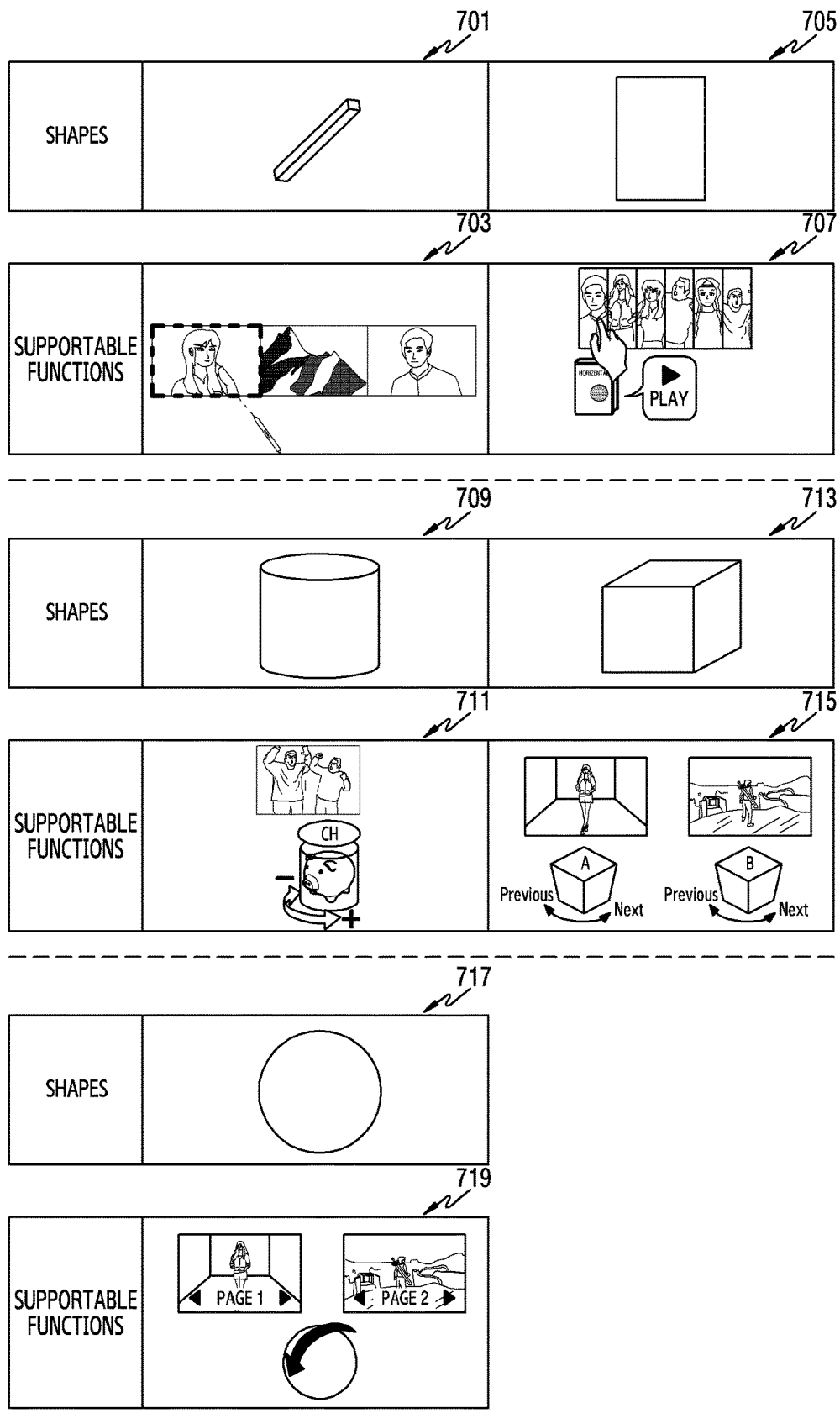
FIG. 7 illustrates an example of a plurality of designated shapes defined in a wearable device according to various embodiments.

In various embodiments, the plurality of the designated shapes shown in FIG. 7 may be used, while the smartphone 310 recognizes the external entity as the controller.

In various embodiments, based on various methods, the processor 210 may recognize the external entity as the controller having one of the plurality of the designated shapes.

For example, to identify the designated shape matching the external entity based on the feature points of the external entity, the processor 210 may search the plurality of the designated shapes from a low dimension to a high dimension. For example, to identify the designated shape matching the external entity, the processor 210 may identify whether the shape of the stick 701 among the plurality of the designated shapes and the external entity match, and identify whether the shape of the quadrangular surface 705 among the plurality of the designated shapes and the external entity match on a condition of identifying that the external entity does not match the shape of the stick 701. The processor 210 may identify whether the shape of the cylinder 709 among the plurality of the designated shapes matches the external entity on the condition that the shape of the rectangular surface 705 does not match the external entity. The processor 210 may identify whether the shape of the cube 713 among the plurality of the designated shapes matches the external entity on the condition that the shape of the cylinder 709 does not match the external entity. However, it is not limited thereto.

For another example, the processor 210 may compare the external entity with each of the plurality of the designated shapes, based on the feature points of the external entity. Based on the comparison result, the processor 210 may identify one designated shape matching the external entity among the plurality of the designated shapes. For example, based on the comparison result, the processor 210 may calculate matching rates of the plurality of the designated shapes and the external entity, and recognize the external entity as the controller having the designated shape with the highest matching rate among the calculated matching rates. However, it is not limited thereto.

As yet another example, the processor 210 may identify a designated shape which may be used to control content displayed on the display area of the display 250 among the plurality of the designated shapes, and detect an external entity matching the designated shape using the camera 230. The processor 210 may recognize the detected external entity as a controller having the designated shape. However, it is not limited thereto.

Figure 8:
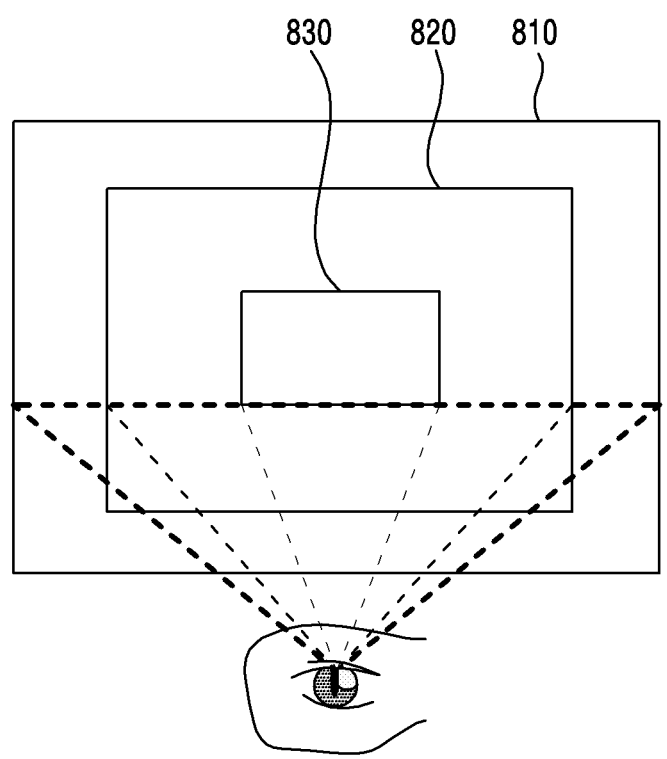
FIG. 8 illustrates an example of areas defined in a wearable device according to various embodiments.

In various embodiments, the processor 210 may recognize the external entity as a controller having a designated shape, and then display information related to the controller on the display area of the display 250 as associated with the external entity. The information related to the external entity may be provided differently according to a location of the external entity. For example, the area covered by the FOV of the camera 230 of the wearable device 110 (hereafter, referred to as a first area), the area covered by the FOV of the user wearing the wearable device 110 (hereafter, referred to as a second area), and the display area of the display 250 of the wearable device 110 (hereafter, referred to as a third area) may be different from one another. For example, referring to FIG. 8, a first area 810 may include a second area 820. For example, an external entity located outside of the second area 820 and within the first area 810 is not identified by the user wearing the wearable device 110, but may be identified by the camera 230. As another example, referring to FIG. 8, the second area 820 may include a third region 830. For example, if the external entity is located outside of the third area 830 and within the second area 820, the user may identify the external entity, but the wearable device 110 may not display the information related to the external entity as superimposed on the external entity. However, the first area, the second area, and the third area are not limited thereto.

Figure 9A:
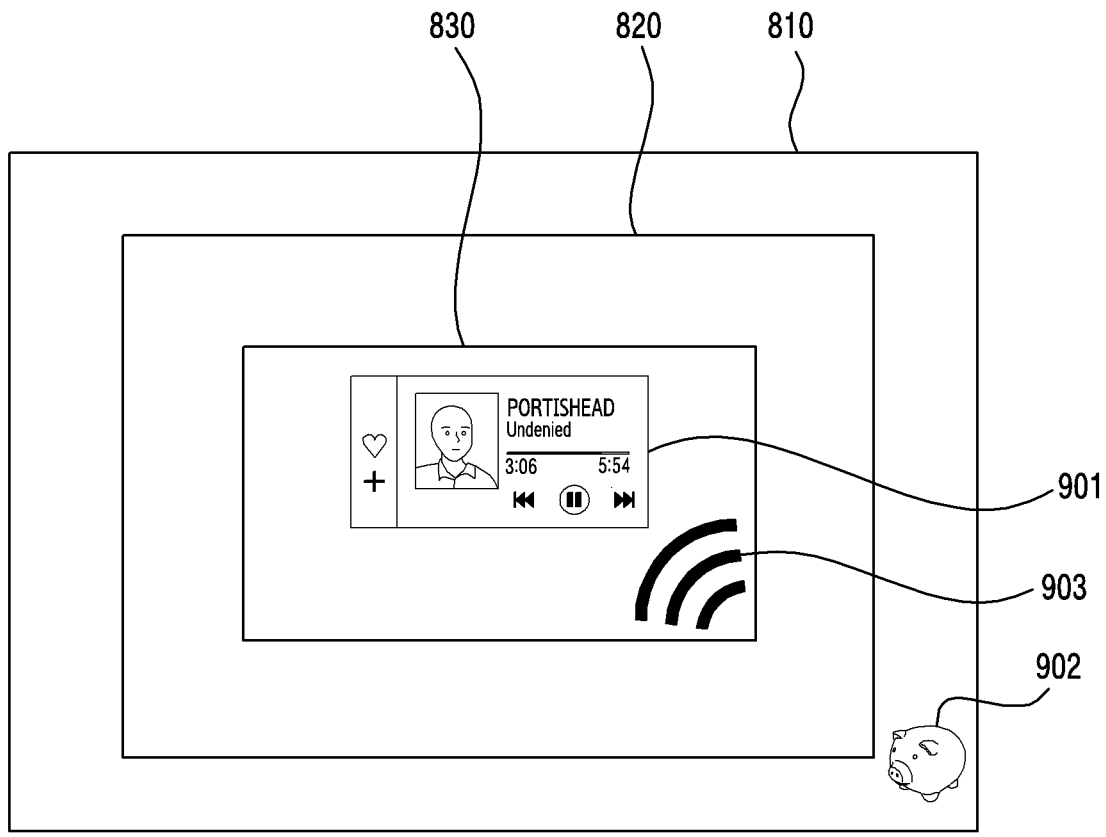
FIG. 9A illustrates an example of a wearable device for displaying information related to an external entity according to various embodiments.

In various embodiments, if the external entity recognized by the controller (or the external entity to be recognized as the controller) is within the first area 810 and outside of the second area 820, the processor 210 may display visual affordance indicating that the external entity is available as the information related to the external entity. A display location of the visual affordance may be a partial area within the display area of the display 250 adjacent to the external entity. For example, referring to FIG. 9A, the processor 210 may detect an external entity 902 using the camera 230, while displaying content 901. To notify presence of the external entity 902 recognized as the controller or the external entity 902 recognizable as the controller, the processor 210 may display visual affordance 903 for guiding a direction in which the external entity 902 is located within the third area 830 together with the content 901. The visual affordance 903 may be displayed within a partial area of the third region 830 adjacent to the external entity 902. According to embodiments, the processor 210 may change a state of the visual affordance 903, as a distance between the partial area displaying the visual affordance 903 and the external entity 902 decreases (or increases). The wearable device 110 may notify the change of the positional relation of the external entity 902, using the state change of the visual affordance 903.

Figure 9B:
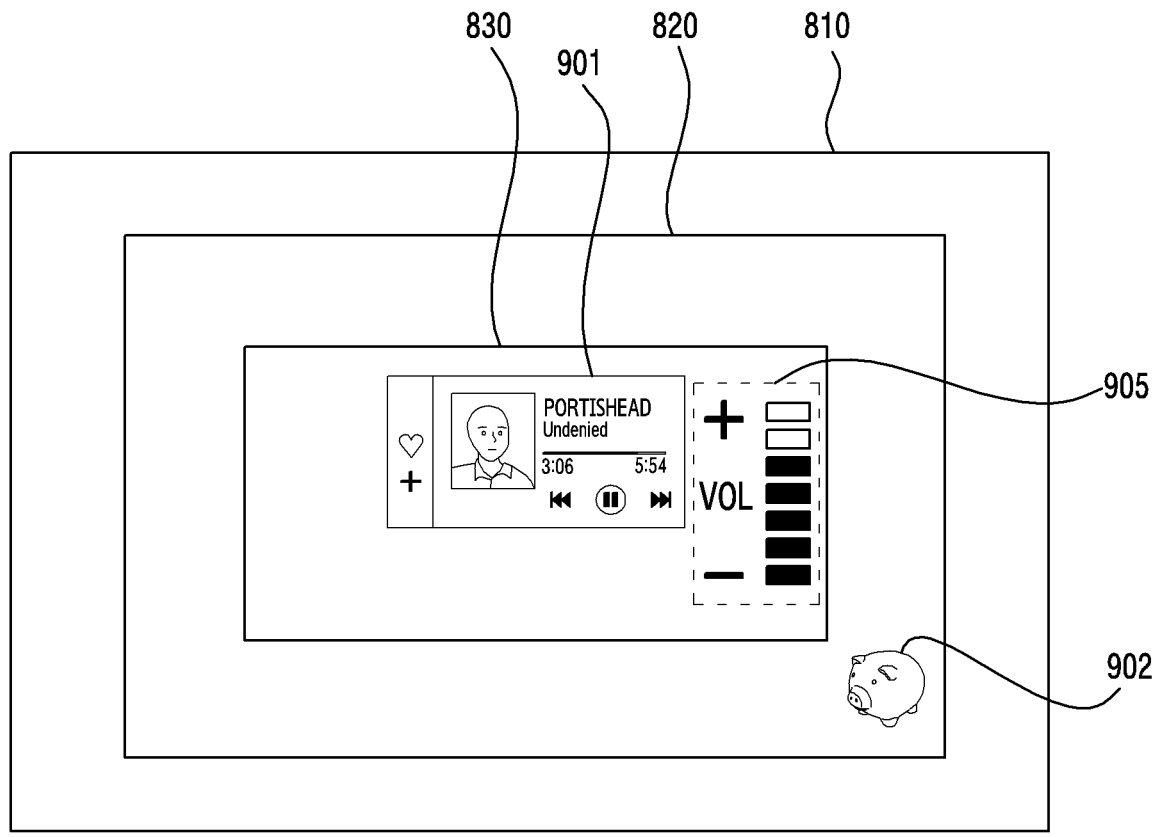
FIG. 9B illustrates another example of a wearable device for displaying the information related to the external entity according to various embodiments.

In various embodiments, if the external entity recognized as the controller is within the second area 820 and outside of the third area 830, the processor 210 may display a visual entity indicating a function which may be controlled by the external entity as the information related to the external entity. A display position of the visual entity may be a partial area in the display area of the display 250 adjacent to the external entity. For example, referring to FIG. 9B, the processor 210 may detect the external entity 902 using the camera 230, while displaying the content 901. To notify that the function related to the content 901 may be controlled using the external entity 902 recognized as the controller, the processor 210 may display a visual entity 905 for indicating the function controllable using the external entity 902 within the third area 830. The visual entity 905 may be displayed in a partial area of the third area 830 adjacent to the external entity 902. According to embodiments, the processor 210 may control the content 901, based on a posture change of the external entity 902 caused by the user, a gesture input for the external entity 902, or a combination thereof, and change the state of the visual entity 905 to indicate that the function of the content 901 is controlled. The wearable device 110 may feed a result of controlling the content 901 by the external entity 902 back, using the state change of the visual entity 905.

Figure 9C:
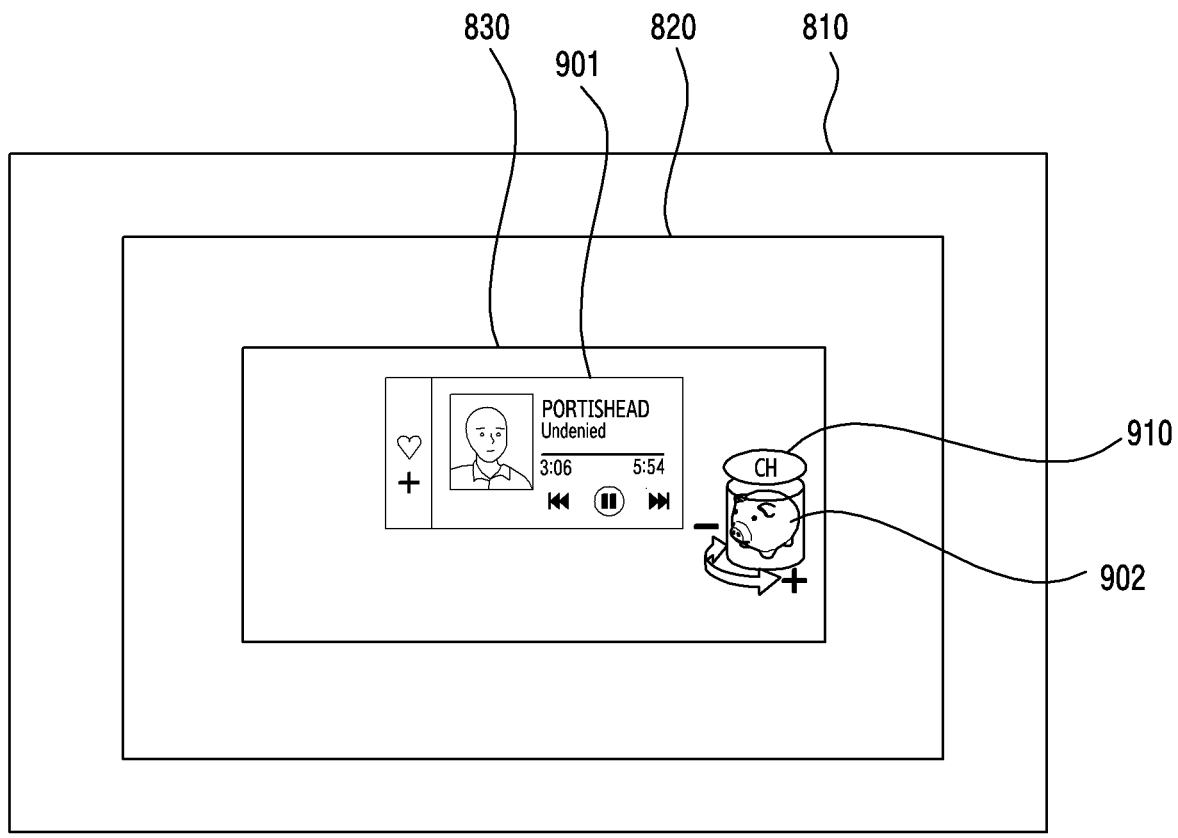
FIG. 9C illustrates yet another example of the wearable device for displaying the information related to the external entity according to various embodiments.

In various embodiments, if the external entity recognized as the controller is within the third area 830, the processor 210 may display a visual entity indicating a function controllable by the external entity as the information related to the external entity. A display position of the visual entity may be superimposed at least in part on the external entity. For example, referring to FIG. 9C, the processor 210 may detect the external entity 902 using the camera 230, while displaying the content 901. To notify that the function related to the content 901 may be controlled using the external entity 902 recognized as the controller, the processor 210 may display a visual entity 910 for indicating the function controllable using the external entity 902 in the third area 830, as superimposed at least in part on the external entity 902 viewed in the third region 830. In various embodiments, the visual entity 910 may include a visual element for notifying an input method for controlling the external entity 902. In various embodiments, the processor 210 may control the content 901, based on a posture change of the external entity 902 caused by the user, a gesture input for the external entity 902, or a combination thereof, and change a state of the visual entity 910 to indicate that the function of the content 901 is controlled. The wearable device 110 may feed a result of controlling the content 901 by the external entity 902 back, using the state change of the visual entity 910.

In various embodiments, the processor 210 may control content having a plurality of functions using an external entity recognized as a controller. In various embodiments, if the content displayed on the display 250 has a plurality of functions, the processor 210 may select the plurality of the functions and control the selected function, based at least on a user input to the external entity or a location of the external entity. For example, referring to FIG. 9D, the processor 210 may display content 955 on the display 250, together with an external entity 950 recognized as a controller having a cylindrical shape viewed in the display 250. In various embodiments, the content 955 may include a first function for controlling a playback time of the content 955, a second function for controlling a volume of the content 955, and a third function for controlling magnification of the content 955. For example, based on a user input which single-taps an upper surface of the external entity 950, the processor 210 may select the first function from the first function, the second function, and the third function, and change the playback time of the content 955 based on receiving a rotation input for the external entity 950 after the first function is selected. For another example, based on a user input which double-taps the upper surface of the external entity 950, the processor 210 may select the second function from the first function, the second function, and the third function, and change the volume of the content 955 based on receiving a rotation input for the external entity 950 after the second function is selected. For yet another example, based on a user input which triple-taps the upper surface of the external entity 950, the processor 210 may select the third function from the first function, the second function, and the third function, and change the magnification of the content 955 based on receiving a rotation input for the external entity 950 after the third function is selected. However, it is not limited thereto.

Figure 9D:
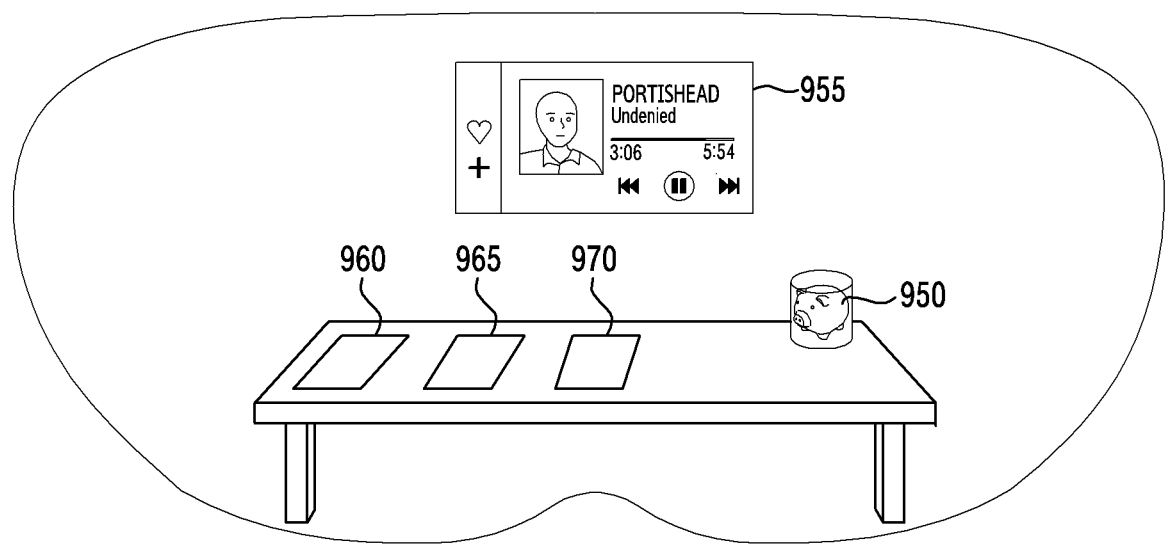
FIG. 9D illustrates an example of controlling content having a plurality of functions using an external entity recognized as a controller according to various embodiments.

As another example, referring to FIG. 9D, the processor 210 may display the content 955 on the display 250, together with an external entity 950 recognized as a controller having a cylindrical shape viewed in the display 250. In various embodiments, the content 955 may include a first function for controlling a playback time of the content 955, a second function for controlling a volume of the content 955, and a third function for controlling magnification of the content 955. For example, based on identifying that the external entity 950 is positioned on an area 960, the processor 210 may select the first function from the first function, the second function, and the third function, and change the playback time of the content 955 based on receiving a rotation input for the external entity 950 after the first function is selected. For another example, based on identifying that the external entity 950 is positioned on an area 965, the processor 210 may select the second function from the first function, the second function, and the third function, and change the volume of the content 955 based on receiving a rotation input for the external entity 950 after the second function is selected. For yet another example, based on identifying that the external entity 950 is positioned on an area 970, the processor 210 may select the third function from the first function, the second function, and the third function, and change the magnification of the content 955 based on receiving a rotation input for the external entity 950 after the third function is selected. However, it is not limited thereto.

As described above, the wearable device 110 according to various embodiments may provide enhanced user experience, by defining or recognizing the external entity around the wearable device 110 as the controller of the wearable device 110.

As state above, a wearable device (e.g., the wearable device 110) according to various embodiments may include a display (e.g., the display 250) configured to allow external light toward a first surface to go through a second surface opposite to the first surface, and having a display area on the second surface, a memory (e.g., the memory 220) for storing instructions, at least one camera (e.g., the camera 230), and at least one processor (e.g., the processor 210) configured to, when executing the instructions, display content on the display area of the display, detect an external entity using the at least one camera, recognize the external entity as a controller for controlling the content having one designated shape of a plurality of designated shapes, identify a posture change of the external entity recognized as the controller, a gesture input for the external entity recognized as the controller, or a combination thereof using the at least one camera, and control the content, based on the identification.

In various embodiments, the at least one processor may be configured to, when executing the instructions, in response to detecting the external entity, compare the external entity with each of the plurality of the designated shapes, based on a result of the comparison, identify a designated shape matching the external entity among the plurality of the designated shapes, and recognize the external entity as the controller for controlling the content, in response to identifying the designated shape.

In various embodiments, a communication circuit (e.g., the communication circuit 240) may be further included, and the at least one processor may be configured to, when executing the instructions, receive from an external electronic device a message including information of the external entity and information indicating that the external entity is defined as the controller, after receiving the message, detect the external entity, while displaying the content, and recognize the external entity as the controller for controlling the content having the designated shape, based on the message.

In various embodiments, the at least one processor may be configured to, when executing the instructions, after detecting the external entity, identify that it is required to control the content while displaying the content, and recognize the external entity as the controller for controlling the content, based on identifying that the content control is required.

In various embodiments, the at least one processor may be configured to, when executing the instructions, in response to determining to display the content, identify whether the external entity preregistered as the controller for controlling the content is in an FOV of the at least one camera, and based on the identification, detect the external entity using the at least one camera.

In various embodiments, the at least one processor may be configured to, when executing the instructions, while identifying that the external entity is in the FOV of the at least one camera and outside of an FOV of a user wearing the wearable device after the recognition, display visual affordance related to the external entity on the display area. In various embodiments, the at least one processor may be configured to, when executing the instructions, while identifying that the external entity is within the FOV of the user and outside of the display area after the recognition, display information of at least one function supportable by the controller on a partial area of the display area adjacent to the external entity. In various embodiments, the at least one processor may be configured to, when executing the instructions, while identifying that the external entity is viewed within the display area after the recognition, display information of the at least one function as associated with the external entity on the display area. In various embodiments, the information of the at least one function may be superimposed on the external entity, while identifying that the external entity is viewed in the display area.

In various embodiments, the at least one processor may be configured to, when executing the instructions, while displaying the content, receive a user input requesting to control the content, in response to receiving the user input, identify the external entities including the external entity in an FOV of the at least one camera using the at least one camera, by comparing each of the external entities and each of the plurality of the designated shapes, calculate matching rates of the external entities and the plurality of the designated shapes, based on the calculation, identify a combination of the designated shape and the external entity having the highest matching rate, and recognize the external entity as the controller for controlling the content, based on identifying the combination of the designated shape and the external entity.

In various embodiments, the at least one processor may be configured to, when executing the instructions, identify the designated shape corresponding to characteristics of the content among the plurality of the designated shapes, and recognize the external entity as the controller having the designated shape, based on identifying that the matching rate of the designated shape and the external entity is higher than a reference matching rate.

Figure 10:
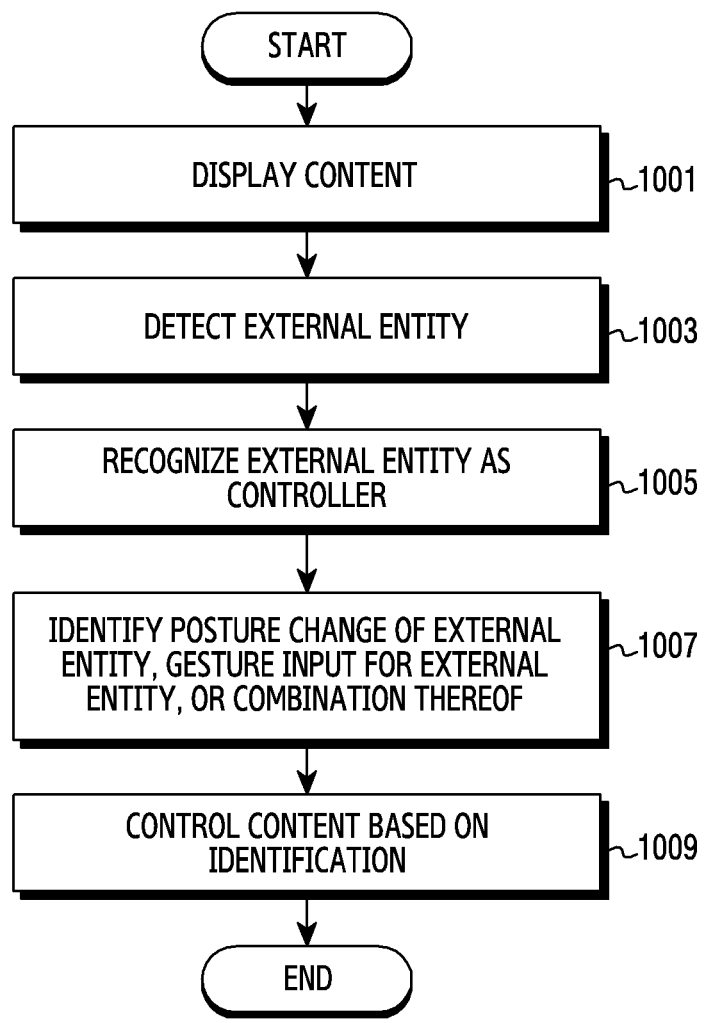
FIG. 10 illustrates an example of operations of a wearable device according to various embodiments.

FIG. 10 illustrates an example of operations of a wearable device according to various embodiments. Such operations may be fulfilled by the wearable device 110 shown in FIG. 1, the wearable device 110 shown in FIG. 2, or the processor 210 of the wearable device 110.

Referring to FIG. 10, in operation 1001, the processor 210 may display content on the display area of the display 250. For example, the processor 210 may display the content on the display area of the display 250, based on data received from an external electronic device (e.g., the smartphone 310). As another example, the processor 210 may display the content on the display area of the display 250, without use of the external electronic device. However, it is not limited thereto.

In operation 1003, the processor 210 may detect an external entity using the camera 230. For example, the processor 210 may acquire an image including a visual entity corresponding to the external entity using the camera 230, and detect the external entity by recognizing the acquired image.

In operation 1005, the processor 210 may recognize the detected external entity as a controller. For example, the processor 210 may recognize the detected external entity as the controller having one designated shape of a plurality of designated shapes. In various embodiments, the controller may be used to control the content. In various embodiments, the controller may be used to control the wearable device 110, independently of the content. However, it is not limited thereto.

In operation 1007, after the recognition, the processor 210 may identify a posture change of the external entity recognized as the controller, a gesture input for the external entity, or a combination thereof using the camera 230. For example, the processor 210 may identify using the camera 230 that the external entity recognized as the controller is rotated by the user. As another example, the processor 210 may identify using the camera 230 that the user taps the external entity recognized as the controller. As another example, the processor 210 may identify using the camera 230 that the external entity recognized as the controller is moved by the user. However, it is not limited thereto.

In operation 1009, the processor 210 may control the content, based on the identification. For example, based on the identification, the processor 210 may determine a control command indicated by the identification. The processor 210 may control the content, based on the determination.

FIG. 10 illustrates the example in which the wearable device 110 displays the content, which is for the sake of descriptions. The wearable device 110 may recognize the external entity as the controller independently of whether the content is displayed. For example, the wearable device 110 may be worn by the user without displaying the content. In this case, the wearable device 110 may determine whether the external entity may be recognized as the controller based on detecting the external entity. Based on determining that the external entity may be recognized as the controller, the wearable device 110 may recognize the controller having the designated shape, and display the content on the display area of the display 250 after the recognition. The content displayed after the recognition may be controlled by the external entity recognized as the controller.

As mentioned above, the wearable device 110 according to various embodiments may provide a more intuitive input, by recognizing the external entity around the wearable device 110 as the controller. In other words, the wearable device 110 according to various embodiments may provide enhanced user experience, in terms of interaction.

Figure 11:
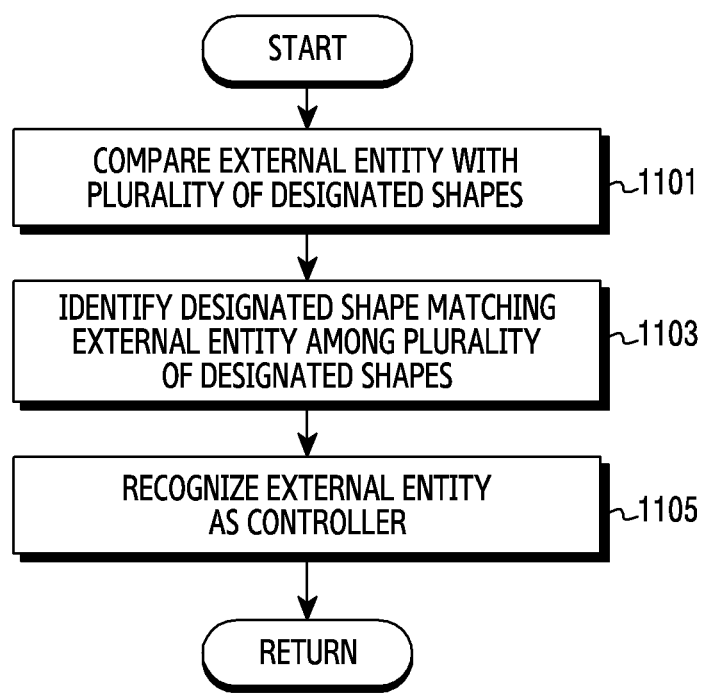
FIG. 11 illustrates an example of operations of a wearable device which recognizes an external entity as a controller according to various embodiments.

FIG. 11 illustrates an example of operations of a wearable device which recognizes an external entity as a controller according to various embodiments. Such operations may be fulfilled by the wearable device 110 shown in FIG. 1, the wearable device 110 shown in FIG. 2, or the processor 210 of the wearable device 110.

Operation 1101 through operation 1103 of FIG. 11 may be related to operation 1005 of FIG. 10.

Referring to FIG. 11, in operation 1101, the processor 210 may compare a detected external entity with a plurality of designated shapes. In various embodiments, the plurality of the designated shapes each may be a representative shape of a controller such as an auxiliary input device. For example, the processor 210 may compare the external entity with each of the plurality of the designated shapes, to use the external entity as the controller.

In operation 1103, based on a result of the comparison, the processor 210 may identify a designated shape matching the external entity among the plurality of the designated shapes. For example, the processor 210 may obtain information of matching rates of the plurality of the designated shapes and the shape of the external entity as the result of the comparison. The processor 210 may identify a designated shape having the highest matching rate among the matching rates as the designated shape matching the external entity.

In operation 1105, based on the identification, the processor 210 may recognize the external entity as the controller having the designated shape. For example, if the external entity is recognized as a controller having a bar shape, the processor 210 may define the external entity as a pointer. For example, after defining the external entity as the pointer, the processor 210 may identify using the camera 230 a location which the external entity faces, identify a visual entity in the content disposed at the identified location, and provide a function provided by the visual entity based on the identification of the visual entity. As another example, if the external entity is recognized as a controller having a cube shape, the processor 210 may define the external entity as a dice-shaped auxiliary input device. For example, after defining the external entity as the dice-shaped auxiliary input device, the processor 210 may identify using the camera 230 which surface of the external entity is an upper surface, and provide a function of a menu corresponding to the identified upper surface. For example, if the upper surface is a first surface of the cube, the processor 210 may provide a first function corresponding to the first surface, and if the upper surface is a second surface of the cube, the processor 210 may provide a second function corresponding to the second surface. However, it is not limited thereto.

Figure 12:
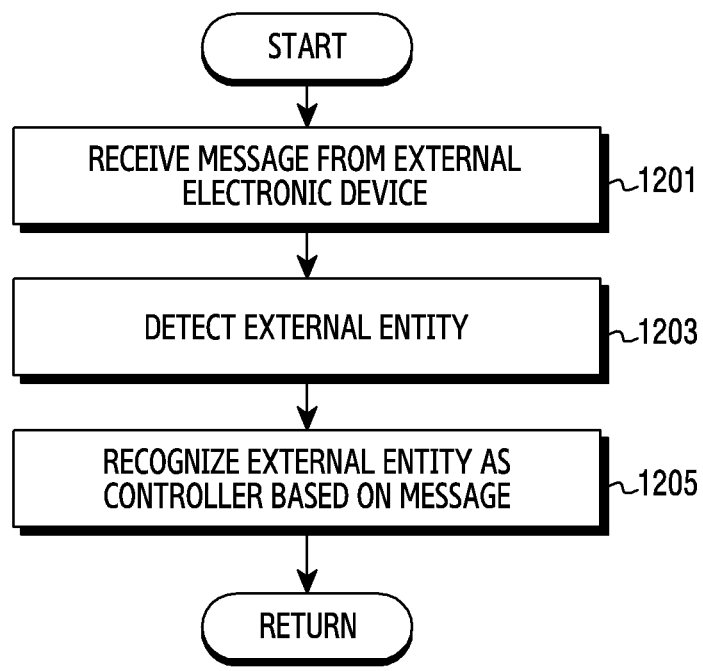
FIG. 12 illustrates another example of operations of a wearable device which recognizes an external entity as a controller according to various embodiments.

FIG. 12 illustrates another example of operations of a wearable device for recognizing an external entity as a controller according to various embodiments. Such operations may be fulfilled by the wearable device 110 shown in FIG. 1, the wearable device 110 shown in FIG. 2, or the processor 210 of the wearable device 110.

Operation 1201 through operation 1205 of FIG. 12 may be related to operation 1003 and operation 1005 of FIG. 10.

Referring to FIG. 12, in operation 1201, the processor 210 may receive a message from an external electronic device (e.g., the smart phone 310). In various embodiments, the message may include information of an external entity and information indicating that the external entity is defined as a controller. In various embodiments, the external entity information may include data of feature points of a visual entity corresponding to the external entity. In various embodiments, the information for indicating that the external entity is defined as the controller may include data for indicating what shape of the controller is defined as the external entity.

In operation 1203, the processor 210 may detect an external entity related to the message, while displaying content. For example, the processor 210 may search for the external entity related to the message, among a plurality of external entities in the FOV of the camera 230. The processor 210 may detect the external entity, by searching the external entity.

In operation 1205, based on the message, the processor 210 may recognize the external entity as the controller having the designated shape. For example, after detecting the external entity, based on the data for indicating what shape of the controller the external entity identified from the message is defined as, the processor 210 may recognize the external entity as the controller having the designated shape.

Figure 13:
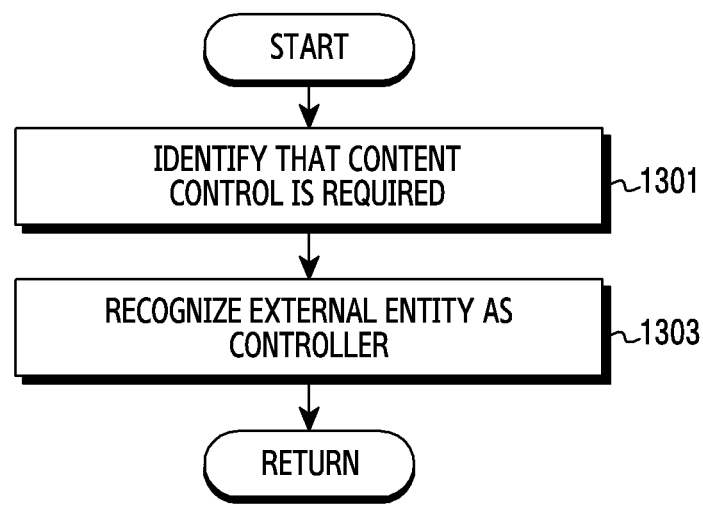
FIG. 13 illustrates yet another example of operations of a wearable device which recognizes an external entity as a controller according to various embodiments.

FIG. 13 illustrates yet another example of operations of a wearable device for recognizing an external entity as a controller according to various embodiments. Such operations may be fulfilled by the wearable device 110 shown in FIG. 1, the wearable device 110 shown in FIG. 2, or the processor 210 of the wearable device 110.

Operation 1301 and operation 1303 of FIG. 13 may be related to operation 1005 of FIG. 10.

Referring to FIG. 13, in operation 1301, after detecting the external entity, the processor 210 may identify that control of the content is required while displaying the content. For example, after detecting the external entity, the processor 210 may not recognize the external entity as the controller until the content control is required. The processor 210 may identify whether it is required to control the content instead of recognizing the external entity as the controller after detecting the external entity. The processor 210 may identify that it is required to control the content after detecting the external entity. For example, the processor 210 may identify that a visual entity requesting a user input is displayed within the content. As another example, the processor 210 may receive a user input requesting the control of the content, while displaying the content. However, it is not limited thereto.

In operation 1303, the processor 210 may recognize the external entity as the controller, based on identifying that it is required to control the content. In various embodiments, after recognizing the external entity as the controller, the processor 210 may initiate identifying whether a posture change of the external entity occurs, whether a gesture input for the external entity occurs, or a combination thereof, to use the external entity as the controller.

Figure 14:
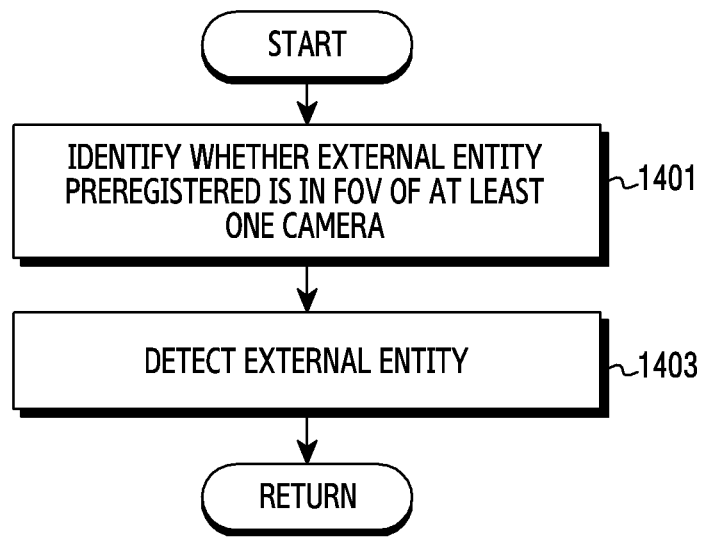
FIG. 14 illustrates an example of operations of a wearable device for detecting an external entity according to various embodiments.

FIG. 14 illustrates an example of operations of a wearable device for detecting an external entity according to various embodiments. Such operations may be fulfilled by the wearable device 110 shown in FIG. 1, the wearable device 110 shown in FIG. 2, or the processor 210 of the wearable device 110.

Operation 1401 and operation 1403 of FIG. 14 may be related to operation 1003 of FIG. 10.

Referring to FIG. 14, in operation 1401, in response to determining to display the content, the processor 210 may identify whether an external entity preregistered as a controller for controlling the content is within the FOV of the camera 230. For example, if information of the external entity defined to be used as the controller is preregistered in the wearable device 110, the processor 210 may search whether an external entity registered as the controller exists using the camera 230, in response to determining to display the content.

In operation 1403, the processor 210 may detect the external entity, by identifying the preregistered external entity in the FOV of the camera 230. For example, the processor 210 may detect the external entity by identifying the external entity among a plurality of external entities around the wearable device 110, based on information of feature points of a visual entity corresponding to the preregistered external entity.

Figure 15:
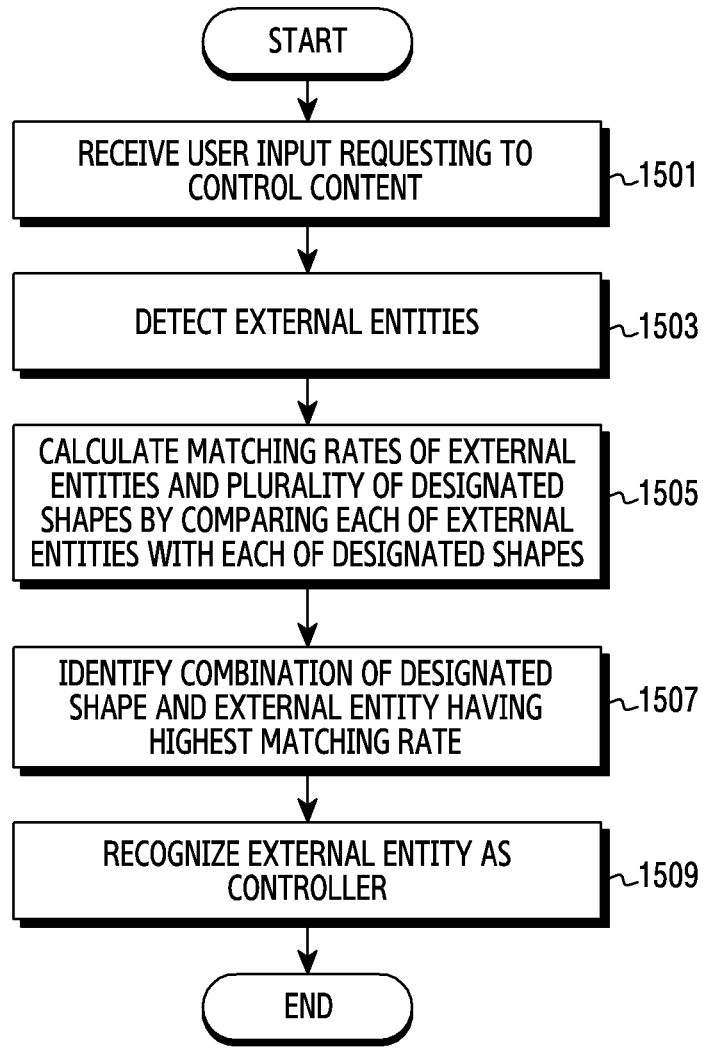
FIG. 15 illustrates still another example of operations of a wearable device which recognizes an external entity as a controller according to various embodiments.

FIG. 15 illustrates still another example of operations of a wearable device for recognizing an external entity as a controller according to various embodiments. Such operations may be fulfilled by the wearable device 110 shown in FIG. 1, the wearable device 110 shown in FIG. 2, or the processor 210 of the wearable device 110.

Operation 1501 through operation 1509 of FIG. 15 may be related to operation 1003 and operation 1005 of FIG. 10.

Referring to FIG. 15, in operation 1501, the processor 210 may receive a user input requesting to control content. For example, while displaying the content on the display area of the display 250, the processor 210 may receive the user input requesting the content control.

In operation 1503, the processor 210 may identify external entities around the wearable device 110 using the camera 230, in response to receiving the user input. In various embodiments, the processor 210 may identify the external entities, to search for an external entity to be used as a controller for controlling the content.

In operation 1505, the processor 210 may compare each of the external entities with each of a plurality of designated shapes and thus calculate matching rates of the external entities and the plurality of the designated shapes. For example, the processor 210 may extract feature points from visual entities corresponding to the external entities respectively, and calculate the matching rates of the external entities and the plurality of the designated shapes, based on the extracted feature points.

In operation 1507, based on the calculation, the processor 210 may identify a combination of the designated shape and the external entity having the highest matching rate. For example, if a matching rate of an external entity A and a designated shape a is 10%, a matching rate of an external entity B and the designated shape a is 20%, a matching rate of the external entity A and a designated shape b is 50%, and a matching rate of the external entity B and the designated shape b is 98%, the processor 210 may identify the combination of the external entity B and the designated shape b.

In operation 1509, based on the identified combination, the processor 210 may recognize the external entity as the controller having the designated shape. For example, the processor 210 may recognize the external entity B as the controller having the designated shape b.

Figure 16:
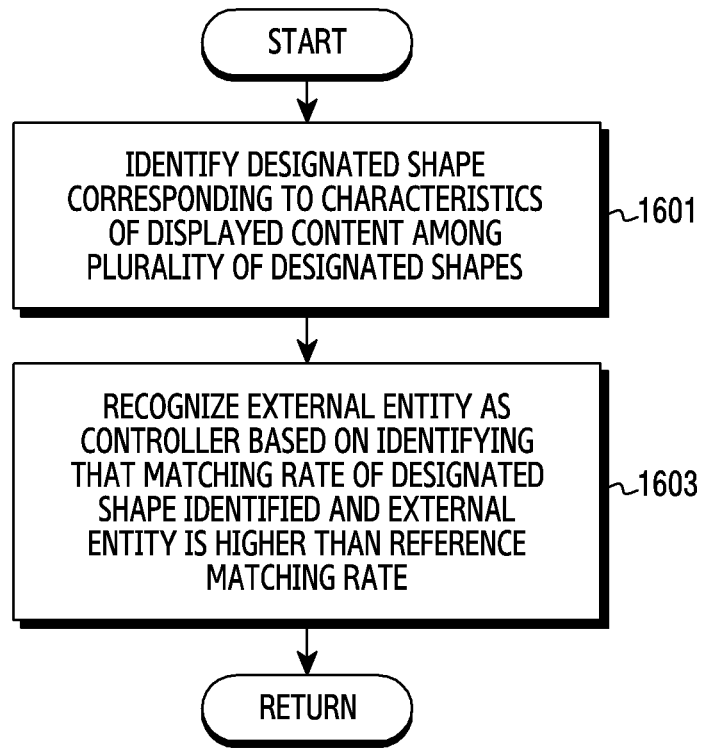
FIG. 16 illustrates a further example of operations of a wearable device which recognizes an external entity as a controller according to various embodiments.

FIG. 16 illustrates a further example of operations of a wearable device for recognizing an external entity as a controller according to various embodiments. Such operations may be fulfilled by the wearable device 110 shown in FIG. 1, the wearable device 110 shown in FIG. 2, or the processor 210 of the wearable device 110.

Operation 1601 and operation 1603 of FIG. 16 may be related to operation 1005 of FIG. 10.

Referring to FIG. 16, in operation 1601, the processor 210 may identify a designated shape corresponding to characteristics of displayed content among a plurality of designated shapes. For example, if the content is a presentation document, the processor 210 may identify a bar shape among the plurality of the designated shapes as the designated shape corresponding to the characteristics of the content. As another example, if the content is music, the processor 210 may identify a cylinder shape among the plurality of the designated shapes as the designated shape corresponding to the characteristics of the content. However, it is not limited thereto.

In operation 1603, the processor 210 may recognize the external entity as the controller having the designated shape, based on identifying that a matching rate of the designated shape and the external entity is higher than a reference matching rate. For example, after identifying the designated shape, the processor 210 may identify an external entity matching the designated shape among external entities detected using the camera 230. Based on the identification, the processor 210 may identify whether the matching rate of the designated shape and the external entity is higher than the reference matching rate. Based on identifying that the matching rate of the designated shape and the external entity is higher than the reference matching rate, the processor 210 may recognize the external entity as the controller having the designated shape. Based on identifying that the matching rate of the designated shape and the external entity is lower than or equal to the reference matching rate, the processor 210 may identify another designated shape distinguished from the designated shape among the plurality of the designated shapes. The another designated shape may be a shape corresponding to the characteristics of the content, next to the designated shape. Based on identifying the another designated shape, the processor 210 may calculate matching rates of the another designated shape and the external entities detected using and the camera 230, and calculate the external entity having the highest matching rate among the calculated matching rates. If the matching rate of the another designated shape and the external entity is higher than the reference matching rate, the processor 210 may recognize the external entity as the controller having the another designated shape.

As stated above, a method for operating a wearable device according to various embodiments may include displaying content on a display area of a display of the wearable device configured to allow external light toward a first surface to go through a second surface opposite to the first surface, and having the display area on the second surface, detecting an external entity using at least one camera of the wearable device, recognizing the external entity as a controller for controlling the content having one designated shape of a plurality of designated shapes, identifying a posture change of the external entity recognized as the controller, a gesture input for the external entity recognized as the controller, or a combination thereof using the at least one camera, and controlling the content, based on the identification.

In various embodiments, recognizing the external entity as the controller may include, in response to detecting the external entity, comparing the external entity with each of the plurality of the designated shapes, based on a result of the comparison, identifying a designated shape matching the external entity among the plurality of the designated shapes, and recognizing the external entity as the controller for controlling the content, in response to identifying the designated shape.

In various embodiments, the method may further include receiving a message including information of the external entity and information indicating that the external entity is defined as the controller from an external electronic device using a communication circuit of the wearable device, and detecting the external entity may include detecting the external entity while displaying the content after receiving the message, and recognizing the external entity as the controller may include recognizing the external entity as the controller for controlling the content having the designated shape, based on the message.

In various embodiments, recognizing the external entity as the controller may include, after detecting the external entity, identifying that it is required to control the content while displaying the content, and recognizing the external entity as the controller for controlling the content, based on identifying that the content control is required.

In various embodiments, detecting the externa entity may include, in response to determining to display the content, identifying whether the external entity preregistered as the controller for controlling the content is in an FOV of the at least one camera, and based on the identification, detecting the external entity using the at least one camera.

In various embodiments, the method may further include, while identifying that the external entity is in the FOV of the at least one camera and outside of an FOV of a user wearing the wearable device after the recognition, displaying visual affordance related to the external entity on the display area. In various embodiments, the method may further include, while identifying that the external entity is within the FOV of the user and outside of the display area after the recognition, displaying information of at least one function supportable by the controller on a partial area of the display area adjacent to the external entity In various embodiments, the method may further include, while identifying that the external entity is viewed within the display area after the recognition, displaying information of the at least one function as associated with the external entity on the display area. In various embodiments, the information of the at least one function may be superimposed on the external entity, while identifying that the external entity is viewed in the display area.

In various embodiments, recognizing the external entity as the controller may include, while displaying the content, receiving a user input requesting to control the content, in response to receiving the user input, identifying the external entities including the external entity in an FOV of the at least one camera using the at least one camera, by comparing each of the external entities and each of the plurality of the designated shapes, calculating matching rates of the external entities and the plurality of the designated shapes, based on the calculation, identifying a combination of the designated shape and the external entity having the highest matching rate, and recognizing the external entity as the controller for controlling the content, based on identifying the combination of the designated shape and the external entity.

In various embodiments, recognizing the external entity as the controller may include identifying the designated shape corresponding to characteristics of the content among the plurality of the designated shapes, and recognizing the external entity as the controller having the designated shape, based on identifying that the matching rate of the designated shape and the external entity is higher than a reference matching rate.

Methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access a device that performs an embodiment of the disclosure via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

The invention claimed is:

1. A wearable device comprising:
a display configured to allow external light toward a first surface to go through a second surface opposite to the first surface, and having a display area on the second surface;
a memory for storing instructions;
at least one camera; and
at least one processor, the at least one processor configured to, when executing the instructions:
display, via the display, content and a virtual object that is a GUI (Graphical User Interface) that controls a volume of the content,
detect, via the at least one camera, a plurality of external objects,
determine a shape matching one of the plurality of external objects among a plurality of designated shapes as a first shape of the one of the plurality of external objects,
determine a type of input corresponding to the first shape and for controlling the volume of the content, based on the type of the input, detect, via the at least one camera, a user input for rotating the one of the plurality of external objects included in the type of the input for controlling the volume of the content, and
based on the user input, control the virtual object displayed in the display.

2. The wearable device of claim 1, wherein the at least one processor is configured to, when executing the instructions,
in response to detecting the plurality of external objects, compare the plurality of external objects with each of the plurality of the designated shapes,
based on a result of the comparison, identify a designated shape matching the one of the plurality of external objects among the plurality of the designated shapes, and
recognize the one of the plurality of external objects as the controller for controlling the virtual object, in response to identifying the designated shape.

3. The wearable device of claim 1, further comprising:
a communication circuit,
wherein the at least one processor is configured to, when executing the instructions,
receive from an external electronic device a message comprising information of the one of the plurality of external objects and information indicating that the one of the plurality of external objects is defined as the controller,
after receiving the message, detect the one of the plurality of external objects, while displaying the content, and
recognize the one of the plurality of external objects as a controller for controlling the content having the designated shape, based on the message.

4. The wearable device of claim 1, wherein the at least one processor is configured to, when executing the instructions,
after detecting the one of the plurality of external objects, identify that it is required to control the content while displaying the content, and
recognize the one of the plurality of external objects as a controller for controlling the content, based on identifying that the content control is required.

5. The wearable device of claim 1, wherein the at least one processor is configured to, when executing the instructions,
in response to determining to display the content, identify whether the one of the plurality of external objects preregistered as a controller for controlling the content is in a field of view (FOV) of the at least one camera, and
based on the identification, detect the one of the plurality of external objects using the at least one camera.

6. The wearable device of claim 1, wherein the at least one processor is configured to, when executing the instructions,
while identifying that the one of the plurality of external objects is in a FOV of the at least one camera and outside of an FOV of a user wearing the wearable device, display visual affordance related to the one of the plurality of external objects on the display.

7. The wearable device of claim 6, wherein the at least one processor is configured to, when executing the instructions,
while identifying that the one of the plurality of external objects is within the FOV of the user and outside of the display area, display information of at least one function supportable by a controller on a partial area of the display area adjacent to the one of the plurality of external objects.

8. The wearable device of claim 7, wherein the at least one processor is configured to when executing the instructions, while identifying that the one of the plurality of external objects is viewed within the display area, display information of the at least one function as associated with the one of the plurality of external objects on the display.

9. The wearable device of claim 8, wherein the information of the at least one function is superimposed on the one of the plurality of external objects, while identifying that the one of the plurality of external objects is viewed in the display.

10. The wearable device of claim 1, wherein the at least one processor is configured to, when executing the instructions,
while displaying the content, receive the user input requesting to control the content,
in response to receiving the user input, identify the plurality of external objects comprising the one of the plurality of external objects in an FOV of the at least one camera using the at least one camera,
by comparing each of the plurality of external objects and each of the plurality of the designated shapes, calculate matching rates of the each of the plurality of external objects and the plurality of the designated shapes,
based on the calculation, identify a combination of the designated shape and the one of the plurality of external objects having the highest matching rate, and
recognize the one of the plurality of external objects as a controller for controlling the content, based on identifying the combination of the designated shape and the one of the plurality of external objects.

11. The wearable device of claim 1, wherein the at least one processor is configured to, when executing the instructions,
identify the designated shape corresponding to characteristics of the content among the plurality of the designated shapes, and
recognize the one of the plurality of external objects as a controller having the designated shape, based on identifying that a matching rate of the designated shape and the one of the plurality of external objects is higher than a reference matching rate.

12. A method for operating a wearable device, comprising:
displaying, via a display of the wearable device, content and a virtual object that is a GUI (Graphical User Interface) that controls a volume of the content, the display being configured to allow external light toward a first surface to go through a second surface opposite to the first surface, and having a display area on the second surface;
detecting, via at least one camera of the wearable device, a plurality of external objects;
determining a shape matching one of the plurality of external objects among a plurality of designated shapes as a first shape of the one of the plurality of external objects;
determining a type of input corresponding to the first shape and for controlling the volume of the content;
based on the type of the input, detecting, via the at least one camera, a user input for rotating the one of the plurality of external objects included in the type of the input for controlling the volume of the content; and
based on the user input, controlling the virtual object displayed in the display.

13. The method of claim 12, further comprising:
recognizing an external entity as a controller;
in response to detecting the one of the plurality of external objects, comparing the one of the plurality of external objects with each of the plurality of the designated shapes;
based on a result of the comparison, identifying a designated shape matching the one of the plurality of external objects among the plurality of the designated shapes; and
recognizing the one of the plurality of external objects as a controller for controlling the content, in response to identifying the designated shape.

14. The method of claim 12, further comprising:
receiving a message comprising information of the one of the plurality of external objects and information indicating that the one of the plurality of external objects is defined as the controller from an external electronic device using a communication circuit of the wearable device,
wherein detecting the one of the plurality of external objects comprises:
detecting the one of the plurality of external objects while displaying the content after receiving the message, and
recognizing the one of the plurality of external objects as a controller comprises:
recognizing the one of the plurality of external objects as the controller for controlling the content having the designated shape, based on the message.

15. The method of claim 12, wherein recognizing the one of the plurality of external objects as the controller comprises:
after detecting the one of the plurality of external objects, identifying that it is required to control the content while displaying the content; and
recognizing the one of the plurality of external objects as a controller for controlling the content, based on identifying that the content control is required.

* * * * *